(12) United States Patent
Hirose et al.

(10) Patent No.: US 10,141,562 B2
(45) Date of Patent: Nov. 27, 2018

(54) ANODE AND BATTERY

(75) Inventors: Takakazu Hirose, Tokyo (JP);
Masayuki Iwama, Tokyo (JP); Kenichi Kawase, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1808 days.

(21) Appl. No.: 11/932,885

(22) Filed: Oct. 31, 2007

(65) Prior Publication Data

US 2008/0145752 A1    Jun. 19, 2008

(30) Foreign Application Priority Data

Dec. 18, 2006 (JP) .................. 2006-340301

(51) Int. Cl.
| | |
|---|---|
| H01M 2/02 | (2006.01) |
| H01M 4/134 | (2010.01) |
| H01M 4/04 | (2006.01) |
| H01M 4/1395 | (2010.01) |
| H01M 4/70 | (2006.01) |
| H01M 10/05 | (2010.01) |
| H01M 10/0525 | (2010.01) |
| H01M 10/0568 | (2010.01) |
| H01M 10/0569 | (2010.01) |

(52) U.S. Cl.
CPC ......... *H01M 4/134* (2013.01); *H01M 2/0285* (2013.01); *H01M 4/0421* (2013.01); *H01M 4/1395* (2013.01); *H01M 4/70* (2013.01); *H01M 10/05* (2013.01); *H01M 10/0525* (2013.01); *H01M 10/0568* (2013.01); *H01M 10/0569* (2013.01)

(58) Field of Classification Search
CPC ............... H01M 4/134; H01M 4/1395; H01M 10/0525; H01M 4/131; H01M 4/38; H01M 4/485; H01M 10/0569; H01M 10/0587; H01M 4/0421; H01M 10/05; H01M 10/0268
USPC ...................... 429/218.1, 221, 223
See application file for complete search history.

(56) References Cited

U.S. PATENT DOCUMENTS

| | | | |
|---|---|---|---|
| 5,744,258 A * | 4/1998 | Bai ................... | H01M 4/04 429/209 |
| 6,235,427 B1 | 5/2001 | Idota et al. | |
| 6,365,299 B1 * | 4/2002 | Miyaki et al. ........ | 429/218.1 |
| 6,605,386 B1 | 8/2003 | Kasamatso et al. | |

(Continued)

FOREIGN PATENT DOCUMENTS

| | | |
|---|---|---|
| JP | 07-249410 | 9/1995 |
| JP | 09-180721 | 7/1997 |

(Continued)

OTHER PUBLICATIONS

Korean Office Action dated Feb. 25, 2014 for corresponding Korean Appln. No. 2007-0116881.

*Primary Examiner* — Stephen J Yanchuk
(74) *Attorney, Agent, or Firm* — K&L Gates LLP

(57) ABSTRACT

A battery capable of improving the cycle characteristics is provided. The battery includes a cathode, an anode, and an electrolytic solution. The anode includes an anode active material layer containing an anode active material having silicon as an element, and a coating layer that coats the anode active material layer, and contains an oxide of a 3d transition metal element at least one selected from the group consisting of iron, cobalt, and nickel.

42 Claims, 10 Drawing Sheets

(56) References Cited

U.S. PATENT DOCUMENTS

| | | |
|---|---|---|
| 7,141,187 B2 | 11/2006 | Kosuzu et al. |
| 7,410,728 B1* | 8/2008 | Fujimoto et al. ............. 429/245 |
| 2003/0215711 A1* | 11/2003 | Aramata et al. ........... 429/218.1 |
| 2005/0191550 A1* | 9/2005 | Satoh .................... H01M 4/133 |
| | | 429/217 |
| 2005/0196670 A1* | 9/2005 | Yamaguchi et al. .......... 429/200 |
| 2005/0221180 A1* | 10/2005 | Shimura et al. .............. 429/223 |
| 2006/0068287 A1* | 3/2006 | Morita et al. ................. 429/223 |
| 2007/0020520 A1* | 1/2007 | Ugaji ........................ 429/218.1 |
| 2007/0122701 A1* | 5/2007 | Yamaguchi ................ 429/218.1 |
| 2007/0207386 A1* | 9/2007 | Konishiike ......... H01M 4/0423 |
| | | 429/232 |
| 2008/0038631 A1* | 2/2008 | Nakura ................ H01M 2/145 |
| | | 429/144 |
| 2013/0252031 A1* | 9/2013 | Ma ....................... H01M 4/362 |
| | | 429/5 |

FOREIGN PATENT DOCUMENTS

| | | |
|---|---|---|
| JP | 11-007944 | 1/1999 |
| JP | 11-007944 | * 12/1999 |
| JP | 2000-036323 | 2/2000 |
| JP | 2000-173585 | 6/2000 |
| JP | 2001-325950 | 11/2000 |
| JP | 2002-319408 | 10/2002 |
| JP | 2002-329528 | 11/2002 |
| JP | 2004-185810 | 7/2004 |
| JP | 2004-214182 | 7/2004 |
| JP | 2004-259483 | 9/2004 |
| JP | 2005-190695 | 7/2005 |
| JP | 2005-285651 | 10/2005 |
| JP | 2006-294469 | 10/2006 |
| JP | 2000-036323 | 12/2008 |
| KR | 2002-0042735 | 6/2002 |
| WO | 2006/043470 | 4/2006 |
| WO | WO2006-043470 | * 4/2006 |

* cited by examiner

ANODE AND BATTERY

CROSS REFERENCES TO RELATED APPLICATIONS

The present application priority to Japanese Patent Application JP 2006-340301 filed in the Japanese Patent Office on Dec. 18, 2006, the entire contents of which being incorporated herein by reference.

BACKGROUND

The present application relates to an anode having an anode active material layer containing an anode active material and a battery including the anode.

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

In particular, a secondary battery using insertion and extraction of lithium for charge and discharge reaction (so-called lithium ion secondary battery) is extremely prospective, since such a lithium ion secondary battery can provide a higher energy density compared to a lead battery and a nickel cadmium battery.

The lithium ion secondary battery includes an anode having a structure in which an anode active material layer containing an anode active material is provided on an anode current collector. As the anode active material, carbon materials have been widely used. However, in recent years, as the high performance and the multi functions of the portable electronic devices are developed, improving the battery capacity is further demanded. Thus, it has been considered to use silicon instead of the carbon materials. Since the theoretical capacity of silicon (4199 mAh/g) is significantly higher than the theoretical capacity of graphite (372 mAh/g), it is prospected that the battery capacity is thereby highly improved.

In the lithium ion secondary battery using silicon as the anode active material, in order to improve the cycle characteristics as important characteristics of the secondary battery, several techniques have been already proposed. Specifically, a technique in which an antioxidant film made of an oxide coat or a polymer coat is provided on the surface of anode active material particles (for example, refer to Japanese Unexamined Patent Application Publication No. 2004-185810), a technique in which ceramics not reacting with lithium is adhered to an anode active material (for example, refer to Japanese Unexamined Patent Application Publication No. 2000-036323), a technique in which a metal oxide is added to or mixed with an anode active material (for example, refer to Japanese Unexamined Patent Application Publication No. 2000-173585) and the like are known. In addition, as a related art, techniques in which particles of a lithium-containing complex nitride or particles of a lithium-containing complex oxide are coated with conductive micro-powder (for example, refer to Japanese Unexamined Patent Application Publication No. 2001-325950) is also known.

The recent portable electronic devices increasingly tend to become small, and the high performance and the multifunctions tend to be increasingly developed. Thus, there is a tendency that the discharge capacity is easily lowered by frequently repeating charge and discharge of the secondary battery. Therefore, it is aspired that the cycle characteristics of the secondary battery could be further improved.

In the existing secondary batteries, however, there is room for improvement of the cycle characteristics. Specifically, when silicon is used as an anode active material in order to improve the battery capacity in the lithium ion secondary battery, a lithium oxide is formed on the surface of the anode due to repetition of charge and discharge. In this case, the lithium oxide is deposited as an irreversible coat. In the result, the absolute number of lithium (lithium ion) contributing to charge and discharge reaction is decreased, and thereby the discharge capacity is lowered.

SUMMARY

In view of the foregoing, it is desirable to provide an anode and a battery capable of improving the cycle characteristics.

According to an embodiment, there is provided an anode including an anode active material layer containing an anode active material having silicon as an element, and a coating layer that coats the anode active material layer and contains an oxide of a 3d transition metal element (at least one selected from the group consisting of iron, cobalt, and nickel). According to an embodiment, there is provided a battery including a cathode, an anode, and an electrolytic solution, wherein the anode has an anode active material layer containing an anode active material having silicon as an element, and a coating layer that coats the anode active material layer and contains an oxide of a 3d transition metal element (at least one selected from the group consisting of iron, cobalt, and nickel).

The anode of the embodiment has the anode active material layer containing the anode active material having silicon as an element, and the coating layer that coats the anode active material layer and contains the oxide of the 3d transition metal element (at least one selected from the group consisting of iron, cobalt, and nickel). Therefore, when the anode is used for an electrochemical device, a reversible coat containing an electrode reactant is formed, and the absolute number of the electrode reactant is prevented from being decreased. Thereby, in the battery including the anode of the embodiment of the invention, the cycle characteristics can be improved.

Additional features and advantages are described herein, and will be apparent from, the following Detailed Description and the figures.

DETAILED DESCRIPTION

An embodiment will be hereinafter described in detail with reference to the drawings.

Figure 1:
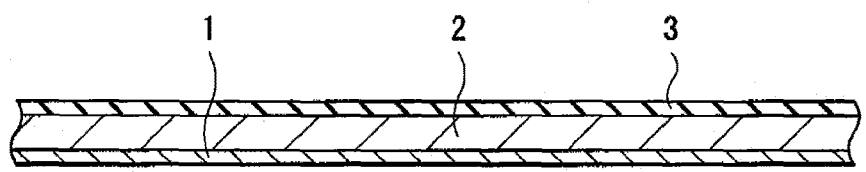
FIG. 1 is a cross section showing a structure of an anode according to an embodiment.

FIG. 1 shows a cross sectional structure of an anode according to an embodiment of the invention. The anode is used, for example, together with a cathode for an electrochemical device such as a battery. The anode has an anode current collector 1 having an opposed pair of faces, an anode active material layer 2 supported by the anode current collector 1, and a coating layer 3 that coats the anode active material layer 2. Though FIG. 1 shows the case that the anode active material layer 2 and the coating layer 3 are provided on a single face of the anode current collector 1, the anode active material layer 2 and the coating layer 3 may be provided on the both faces of the anode current collector 1.

The anode current collector 1 is made of a metal material having the favorable electrochemical stability, the favorable conductivity, and the favorable mechanical strength. As the metal material, for example, copper (Cu), nickel, stainless or the like can be cited. Specially, as the metal material, copper is preferable, since thereby high conductivity can be obtained.

In particular, as the metal material composing the anode current collector 1, a metal material containing one or more metal elements that do not form an intermetallic oxide with an electrode reactant is preferable. When the metal material and the electrode reactant form the intermetallic oxide, as the anode active material layer 2 is expanded and shrunk when the electrochemical device is operated (for example, when the battery is charged and discharged), structural destruction occurs. In the result, current collectivity is lowered, and the anode active material layer 2 is easily separated. As the metal element, for example, copper, nickel, titanium, iron, chromium or the like can be cited.

The foregoing metal material preferably contains one or more metal elements being alloyed with the anode active material layer 2. Thereby, the contact characteristics between the anode current collector 1 and the anode active material layer 2 are improved, and thus the anode active material layer 2 is hardly separated from the anode current collector 1. As a metal element not forming an intermetallic oxide with an electrode reactant and being alloyed with the anode active material layer 2, for example, in the case that an anode active material of the anode active material layer 2 contains silicon as an element, copper, nickel, iron or the like can be cited. Such a metal element is preferable in terms of the strength and the conductivity as well.

The anode current collector 1 may be formed of a single layer or multiple layers. When the anode current collector 1 is formed of multiple layers, for example, it is preferable that the layer contacting with the anode active material layer 2 is made of a metal material being alloyed with the anode active material layer 2, and layers not contacting with the anode active material layer 2 are made of other metal material.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 opposed to the anode active material layer 2 is roughened. As a roughening method, for example, a method of forming microparticles by electrolytic process and the like can be cited. The electrolytic process is a method for providing irregularities by forming particles on the surface of the anode current collector 1 by electrolytic method in an electrolytic bath. A copper foil provided with the electrolytic process is generally called "electrolytic copper foil."

When the surface of the anode current collector 1 is roughened, the ten point height of roughness profile Rz of the surface is preferably in the range from 1.5 µm to 5 µm. Thereby, the contact characteristics between the anode current collector 1 and the anode active material layer 2 are further improved.

The anode active material layer 2 contains an anode active material, and if necessary, may contain a binder, an electrical conductor and the like. The anode active material contains an anode material having silicon as an element, as an anode material capable of inserting and extracting the electrode reactant. Such an anode material has the high ability to insert and extract the electrode reactant, and thereby provides a high energy density. The anode material may be the simple substance, an alloy, or a compound of silicon; or a material having one or more phases thereof at least in part. One thereof may be used singly, or two or more thereof may be used by mixing. In the invention, alloys also include an alloy containing one or more metal elements and one or more metalloid elements, in addition to an alloy including two or more metal elements. It is needless to say that the alloy in the invention may contain nonmetallic elements. The texture thereof may be a solid solution, a eutectic crystal (eutectic mixture), an intermetallic compound, or a texture in which two or more of the foregoing textures coexist.

As the alloy of silicon, for example, an alloy containing at least one selected from the group consisting of tin (Sn), nickel, copper, iron, cobalt, manganese (Mn), zinc (Zn), indium (In), silver (Ag), titanium, germanium (Ge), bismuth (Bi), antimony (Sb), and chromium (Cr) as an element other than silicon can be cited As the compound of silicon, for example, a compound containing oxygen and carbon (C) as an element other than silicon can be cited. The compound of silicon may contain one or more of the elements described for the alloys of silicon, as an element other than silicon.

In particular, the anode active material preferably contains oxygen as an element, since thereby expansion and shrinkage of the anode active material layer 2 is prevented. In the anode active material layer 2, at least part of oxygen is preferably bonded to part of silicon. In this case, the bonding state may be in the form of silicon monoxide, silicon dioxide, or in the form of other metastable state.

The oxygen content in the anode active material is preferably in the range from 3 atomic % to 40 atomic %, since thereby higher effects can be obtained. More specifically, when the oxygen content is smaller than 3 atomic %, expansion and shrinkage of the anode active material layer 2 are not sufficiently suppressed. Meanwhile, when the oxygen content is larger than the 40 atomic %, the resistance is excessively increased. When the anode is used for a battery, the anode active material layer 2 does not include a coat formed by decomposition of the electrolytic solution and the like. That is, when the oxygen content in the anode active material layer 2 is calculated, oxygen in such a coat is not included in the calculation.

The anode active material layer 2 in which the anode active material has oxygen as an element can be formed by continuously introducing oxygen gas into a chamber when the anode active material is deposited by using vapor-phase deposition method. In particular, when a desired oxygen content is not obtained only by introducing the oxygen gas, liquid (for example, moisture vapor or the like) may be introduced into the chamber as a supply source of oxygen.

The anode active material preferably further includes at least one metal element selected from the group consisting of iron, cobalt, nickel, titanium, chromium, and molybdenum, since thereby expansion and shrinkage of the anode active material layer 2 can be prevented.

The content of metal element in the anode active material is preferably in the range from 3 atomic % to 30 atomic %, since thereby higher effects can be obtained. More specifically, when the content of metal element is smaller than 3 atomic %, expansion and shrinkage of the anode active material layer 2 are not sufficiently suppressed. Meanwhile, when the content of metal element is larger than 30 atomic %, the thickness of the anode active material layer 2 becomes excessively large to obtain a desired battery capacity, which is not practical. The reason why the excessive thick anode active material layer 2 is not practical is as follows. That is, in such a case, the anode active material layer 2 is easily separated from the anode current collector 1, or is easily broken.

The anode active material layer 2 in which the anode active material has the metal element as an element can be formed by, for example, using a evaporation source mixed with the metal element or using multiple evaporation sources when the anode active material is deposited by using evaporation as vapor-phase deposition method.

The anode active material layer 2 is formed by using, for example, coating method, vapor-phase deposition method, liquid-phase deposition method, spraying method, firing method, or two or more of these methods. In this case, in particular, it is preferable that the anode active material layer 2 is formed by using vapor-phase deposition method, and the anode active material layer 2 and the anode current collector 1 are alloyed at the interface thereof at least in part. Specifically, it is preferable that at the interface thereof, the element of the anode current collector 1 is diffused in the anode active material layer 2, or the element of the anode active material layer 2 is diffused in the anode current collector 1, or both elements are diffused therein each other. Thereby, breakage of the anode active material layer 2 due to expansion and shrinkage caused by charge and discharge is hardly occurred, and electron conductivity between the anode current collector 1 and the anode active material layer 2 can be improved.

As vapor-phase deposition method, for example, physical deposition method or chemical deposition method can be cited. Specifically, vacuum vapor deposition method, sputtering method, ion plating method, laser ablation method, thermal CVD (Chemical Vapor Deposition) method, plasma CVD method and the like can be cited. As liquid-phase deposition method, a known technique such as electrolytic plating and electroless plating can be used. Firing method is, for example, a method in which a particulate anode active material, a binder and the like are mixed and dispersed in a solvent, and then the anode current collector is coated with the mixture, and the resultant is heat-treated at a temperature higher than the melting point of the binder and the like. For firing method, a known technique such as atmosphere firing method, reactive firing method, and hot press firing method can be cited.

The anode active material layer 2 preferably has a multilayer structure formed by forming films several times. In this case, when the anode active material layer 2 is formed by using evaporation or the like accompanying high heat in film forming, such film forming process of the anode active material layer 2 is performed in several steps (the anode active material layer 2 is made into a lamination by sequentially forming films). Thereby, in this case, time that the anode current collector 1 is exposed at high heat is reduced compared to a case that the anode active material layer 2 is formed into a single layer structure by a single film forming step. In the result, the anode current collector 1 is prevented from being subject to thermal damage.

In particular, it is preferable that the anode active material layer 2 has an oxygen-containing layer in which the anode active material further has oxygen as an element in the thickness direction, and the oxygen content in the oxygen-containing layer is larger than the oxygen content in the other layers. Thereby, expansion and shrinkage of the anode active material layer 2 can be prevented. It is possible that the layers other than the oxygen-containing layer have oxygen as an element, or do not have oxygen as an element. It is needless to say that when the layers other than the oxygen-containing layer have oxygen as an element, the oxygen content thereof is lower than the oxygen content in the oxygen-containing layer.

In this case, to further suppress expansion and shrinkage of the anode active material layer 2, the layers other than the oxygen-containing layer preferably have oxygen as an element. That is, the anode active material layer 2 preferably includes a first oxygen-containing layer (layer having the lower oxygen content) and a second oxygen-containing layer having the higher oxygen content than the first oxygen-containing layer (layer having the higher oxygen content). In particular, it is preferable that the second oxygen-containing layer is sandwiched between the first oxygen-containing layers. It is more preferable that the first oxygen-containing layer and the second oxygen-containing layer are alternately and repeatedly layered. Thereby, higher effects can be obtained. The oxygen content in the first oxygen-containing layer is preferably small as much as possible. The oxygen content in the second oxygen-containing layer is, for example, similar to the oxygen content in the case that the anode active material has oxygen as an element described above.

The anode active material layer 2 including the first oxygen-containing layer and the second oxygen-containing layer can be formed, for example, by intermittently introducing oxygen gas into a chamber when the anode active material is deposited by using vapor-phase deposition method. It is needless to say that when a desired oxygen content is not able to be obtained only by introducing oxygen gas, liquid (for example, moisture vapor or the like) may be introduced into the chamber.

It is possible that the oxygen content of the first oxygen-containing layer is clearly different from the oxygen content of the second oxygen-containing layer, or the oxygen content of the first oxygen-containing layer is not clearly different from the oxygen content of the second oxygen-containing layer. That is, when the introduction amount of the foregoing oxygen gas is continuously changed, the oxygen content may be also continuously changed. In this case, the first oxygen-containing layer and the second oxygen-containing layer are in "a lamellar state" rather than form "layers," and the oxygen content in the thickness direction in the anode active material layer 2 is distributed in a state of ups and downs. In particular, it is preferable that the oxygen content is incrementally or continuously changed between the first oxygen-containing layer and the second oxygen-containing layer. When the oxygen content is rapidly changed, the ion diffusion diffusivity may be lowered, or the resistance may be increased.

Further, the anode active material layer 2 preferably has, in the thickness direction, a metal-element-containing layer having at least one metal element selected from the group consisting of iron, cobalt, nickel, titanium, chromium, and molybdenum as an element. The content of metal element in the metal-element-containing layer is preferably higher than the content of metal element in the other layers. Thereby, expansion and shrinkage of the anode active material layer 2 are suppressed. It is possible that the layers other than the metal-element-containing layer have similar metal element as an element, or do not have similar metal element as an element. It is needless to say that when the layers other than the metal-element-containing layer have similar metal element as an element, the content of metal element thereof is lower than the content of metal element in the metal-element-containing layer.

In this case, to further suppress expansion and shrinkage of the anode active material layer 2, the layers other than the metal-element-containing layer preferably have the metal element as an element. That is, the anode active material layer 2 preferably contains a first metal-element-containing layer (layer having the lower content of metal element) and a second metal-element-containing layer having the higher content of metal element than the first metal-element-containing layer (layer having the higher content of metal element). In this case, it is preferable that the second metal-element-containing layer is sandwiched between the first metal-element-containing layers. It is more preferable that the first metal-element-containing layer and the second metal-element-containing layer are alternately and repeatedly layered. Thereby, higher effects can be obtained. The content of metal element in the first metal-element-containing layer is preferably small as much as possible. The content of metal element in the second metal-element-containing layer is, for example, similar to the content of metal element in the case that the anode active material has the metal element as an element described above.

The anode active material layer 2 including the first metal-element-containing layer and the second metal-element-containing layer can be formed by, for example, preparing two types of chambers (evaporation sources) capable of individually forming the both layers, and by alternately forming and layering the both layers in the chambers.

The coating layer 3 contains an oxide of a 3d transition metal element. The 3d transition metal element is at least one selected from the group consisting of iron, cobalt, and nickel. The oxide is, for example, a compound expressed by $M_xO_y$. (M represents iron, cobalt, or nickel; x represents one of integer numbers 1 to 3, and y represents one of integer numbers 1 to 4.) Since the anode active material layer 2 is coated with the coating layer 3, a reversible coat containing the electrode reactant is formed on the surface of the anode when the anode is used for an electrochemical device. In the result, the absolute number of the electrode reactant is prevented from being decreased.

Specific examples of the oxide include the following compounds, that is, iron I oxide (FeO), iron II oxide (diiron trioxide: $Fe_2O_3$), iron III oxide (triiron tetroxide: $Fe_3O_4$) and the like in the case that M is iron. Specific examples of the oxide include the following compounds, that is, cobalt I oxide (CoO), cobalt III oxide (tricobalt tetroxide: $CO_3O_4$) and the like in the case that M is cobalt. Specific examples of the oxide include the following compounds, that is, nickel I oxide (NiO) and the like in the case that M is nickel. The oxide may be used singly, or a plurality thereof may be used by mixing. Specially, as the oxide, iron I oxide, cobalt I oxide, or nickel I oxide is preferable, since thereby higher effects can be obtained.

The thickness of the coating layer 3 is preferably in the range from 10 nm to 3000 nm, since thereby higher effects can be obtained.

The anode is formed, for example, by the following procedure. That is, first, the anode current collector 1 is prepared. If necessary, the surface of the anode current collector 1 is provided with roughening process. After that, the anode active material having silicon as an element is deposited on the surface of the anode current collector 1 by using vapor-phase deposition method or the like, and thereby the anode active material layer 2 is formed. After that, the oxide of the 3d transition metal element is deposited on the surface of the anode active material layer 2 by using vapor-phase deposition method or the like, and thereby the coating layer 3 is formed.

According to the anode, when the anode active material layer 2 contains the anode active material containing silicon as an element, the anode active material layer 2 is coated with the coating layer 3 containing the oxide of the 3d transition metal element. Therefore, the reversible coat containing the electrode reactant is formed when the anode is used for an electrochemical device. In this case, electrode reaction is repeated and thereby forming and decomposing the coat are repeated over again. Thus, the absolute number of the electrode reactant is prevented from being decreased. In the result, the anode contributes to improve the cycle characteristics in an electrochemical device using the anode. In particular, when the oxide of the 3d transition metal element composing the coating layer 3 is iron I oxide, cobalt I oxide, or nickel I oxide, or when the thickness of the coating layer 3 is in the range from 10 nm to 3000 nm, higher effects can be obtained.

Further, when the anode active material further contains oxygen as an element, and the oxygen content in the anode active material is in the range from 3 atomic % to 40 atomic %, higher effects can be obtained. Such effects can be similarly obtained when the anode active material layer 2 has the oxygen-containing layer in the thickness direction (the layer in which the anode active material further contains oxygen as an element and the oxygen content is higher than the oxygen content of the other layers).

Further, when the anode active material further has at least one metal element selected from the group consisting of iron, cobalt, nickel, titanium, chromium, and molybdenum as an element, and the content of metal element in the anode active material is in the range from 3 atomic % to 30 atomic %, higher effects can be obtained. Such effects can be similarly obtained when the anode active material layer 2 has the metal-element-containing layer in the thickness direction (the layer in which the anode active material further has the foregoing metal element as an element and the content of metal element is higher than the other layers).

Further, when the surface of the anode current collector 1 opposed to the anode active material layer 2 is roughened by the microparticles formed by electrolytic process, the contact characteristics between the anode current collector 1 and the anode active material layer 2 can be improved. In this case, when the ten point height of roughness profile Rz of the surface of the anode current collector 1 is in the range from 1.5 μm to 5 μm, higher effects can be obtained.

A description will be herein given of the technical value of the invention. The technical value of the invention is as follows. When the anode active material layer 2 contains the anode active material having silicon as an element, the oxide of the 3d transition metal element capable of forming a reversible coat with the electrode reactant is provided as the coating layer 3 on the surface of the anode active material layer 2. More specifically, for various purposes, various layers have been already provided on the surface of the anode active material layer 2. However, many layers provided on the surface of the anode active material layer 2 form an irreversible coat with an electrode reactant. Meanwhile, the important value of the invention is as follows. That is, the invention found that only the layer containing the oxide of the 3d transition metal element forms the reversible coat with the electrode reactant. According to such an important value of the invention, enormous technical effects can be obtained.

A description will be hereinafter given of a usage example of the foregoing anode. Taking a battery as an example of electrochemical devices, the anode is used for the battery as follows.

First Battery

Figure 2:
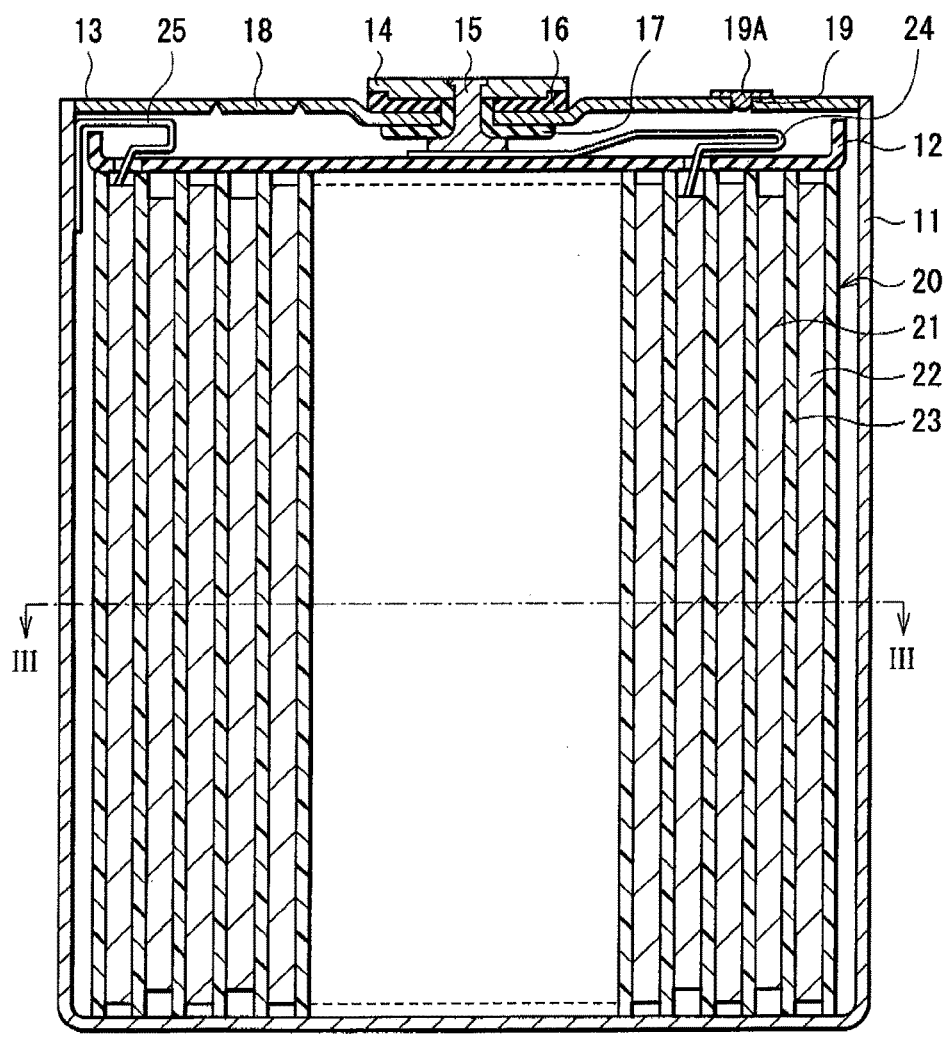
FIG. 2 is a cross section showing a structure of a first battery including the anode according to the embodiment.
Figure 3:
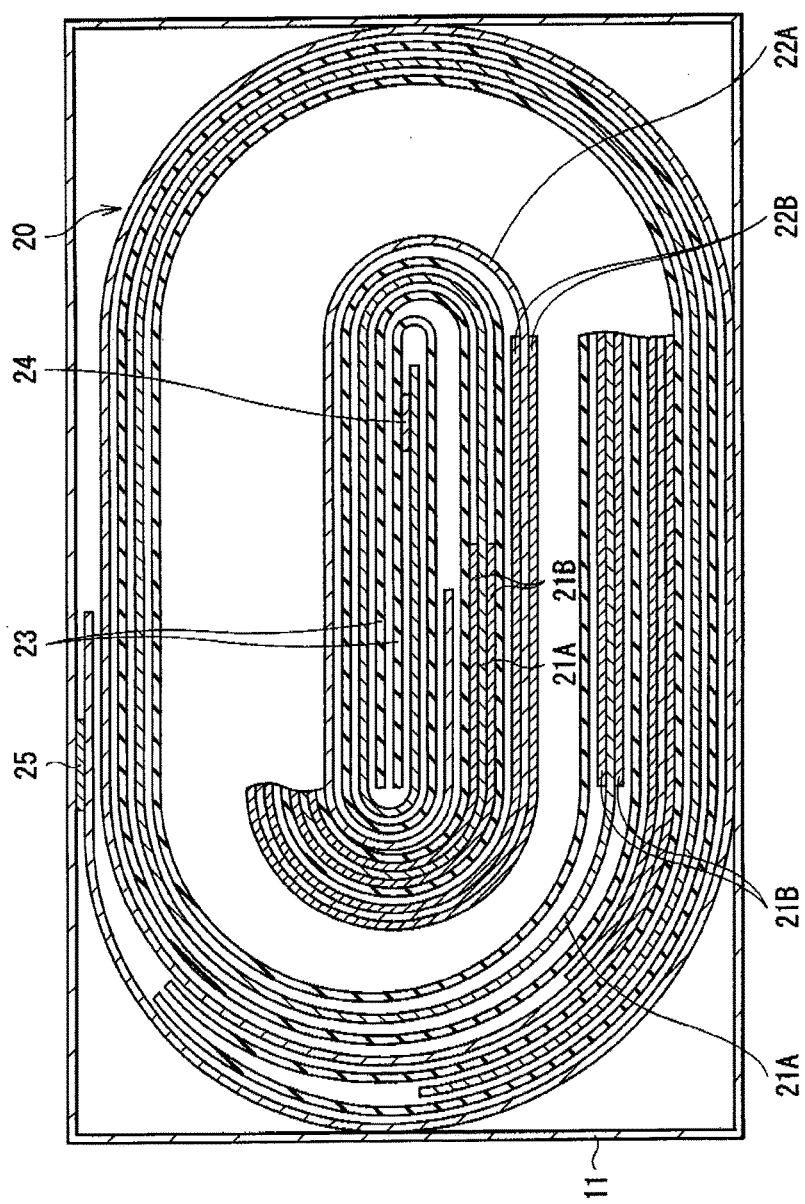
FIG. 3 is a cross section taken along line III-III of the first battery shown in FIG. 2.
Figure 4:
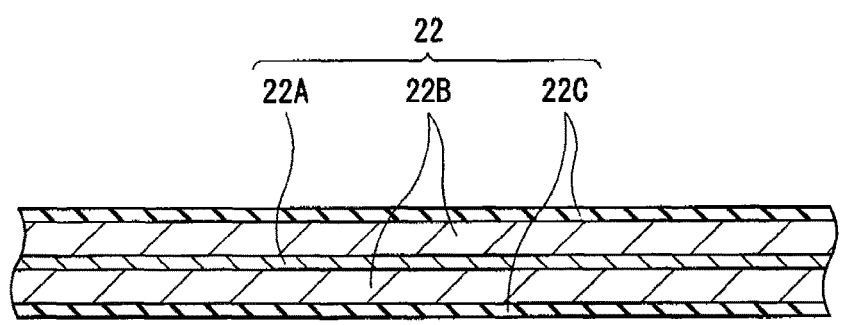
FIG. 4 is a cross section showing an enlarged part of the anode shown in FIG. 2 and FIG. 3.

FIG. 2 to FIG. 4 show a cross sectional structure of a first battery. FIG. 3 shows a cross section taken along line III-III shown in FIG. 2. FIG. 4 shows an exploded part of an anode 22 shown in FIG. 2 and FIG. 3. The battery herein described is, for example, a lithium ion secondary battery in which the capacity of the anode 22 is expressed by the capacity component based on insertion and extraction of lithium as an electrode reactant.

The secondary battery contains a battery element 20 having a flat spirally winding structure inside a battery can 11.

The battery can 11 is, for example, a square package member. As shown in FIG. 3, the square package member has a shape with the cross section in the longitudinal direction of a rectangle or an approximate rectangle (including curved lines in part). The battery can 11 structures not only a square battery in the shape of a rectangle, but also a square battery in the shape of an oval. That is, the square package member means a rectangle vessel-like member with the bottom or an oval vessel-like member with the bottom, which respectively have an opening in the shape of a rectangle or in the shape of an approximate rectangle (oval shape) formed by connecting circular arcs by straight lines. FIG. 3 shows a case that the battery can 11 has a rectangular cross sectional shape. The battery structure including the battery can 11 is the so-called square structure.

The battery can 11 is made of, for example, a metal material containing iron, aluminum (Al), or an alloy thereof. The battery can 11 also has a function as an anode terminal. In this case, to inhibit the secondary battery from being swollen by using the rigidity (hardly deformable characteristics) of the battery can 11 when charged and discharged, the battery can 11 is preferably made of rigid iron than aluminum. When the battery can 11 is made of iron, for example, the iron may be plated by nickel (Ni) or the like.

The battery can 11 also has a hollow structure in which one end of the battery can 11 is closed and the other end thereof is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicular to the spirally winding circumferential face of the battery element 20, and is made of, for example, polypropylene or the like. The battery cover 13 is, for example, made of a material similar to that of the battery can 11, and also has a function as an anode terminal as the battery can 11 does.

Outside of the battery cover 13, a terminal plate 14 as a cathode terminal is arranged. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin 15 is electrically connected to the terminal plate 14, and is electrically insulated from the battery cover 13 with a gasket 17 in between. The gasket 17 is made of, for example, an insulating material, and its surface is coated with asphalt.

In the vicinity of the rim of the battery cover 13, a cleavage valve 18 and an injection hole 19 are provided. The cleavage valve 18 is electrically connected to the battery cover 13. When the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, corundum.

In the battery element 20, a cathode 21 and an anode 22 are layered with a separator 23 in between, and are spirally wound. The battery element 20 is flat according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on the both faces of a strip-shaped cathode current collector 21A. The cathode current collector 21A is made of, for example, a metal material such as aluminum, nickel, and stainless. The cathode active material layer 21B contains a cathode active material, and if necessary, may also contain a binder, a conductive material and the like.

The cathode active material contains one or more cathode materials capable of inserting and extracting lithium as an electrode reactant. As the cathode material, for example, a lithium complex oxide such as lithium cobalt oxide, lithium nickel oxide, a solid solution containing them ($Li(Ni_xCo_yMn_z)O_2$, values of x, y, and z are respectively expressed as $0<x<1$, $0<y<1$, $0<z<1$, and $x+y+z=1$), lithium manganese oxide having a spinel structure ($LiMn_2O_4$), and a solid solution thereof ($Li(Mn_{2-v}Ni_v)O_4$, a value of v is expressed as $v<2$). Further, as the cathode material, for example, a phosphate compound having an olivine structure such as lithium iron phosphate ($LiFePO_4$) can be cited. Thereby, a high energy density can be obtained. In addition, as the cathode material, for example, an oxide such as titanium oxide, vanadium oxide, and manganese dioxide; a disulfide such as iron disulfide, titanium disulfide, and molybdenum sulfide; sulfur; a conductive polymer such as polyaniline and polythiophene can be cited.

The anode 22 has a structure similar to that of the foregoing anode. For example, in the anode 22, an anode active material layer 22B and a coating layer 22C are provided on the both faces of a strip-shaped anode current collector 22A. The structures of the anode current collector 22A, the anode active material layer 22B, and the coating layer 22C are respectively similar to the structures of the anode current collector 1, the anode active material layer 2, and the coating layer 3 in the foregoing anode. In FIG. 3, the coating layer 22C is not illustrated.

The separator 23 separates the cathode 21 from the anode 22, and passes ionic electrode reactant while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered.

An electrolytic solution as a liquid electrolyte is impregnated in the separator 23. The electrolytic solution contains, for example, a solvent and an electrolyte salt dissolved therein.

The solvent contains, for example, one or more nonaqueous solvents such as an organic solvent. The nonaqueous solvents include, for example, an ester carbonate solvent such as ethylene carbonate, propylene carbonate, butylene carbonate, vinylene carbonate, vinyl ethylene carbonate, dimethyl carbonate, diethyl carbonate, ethyl methyl carbonate, and methyl propyl carbonate. Thereby, superior capacity characteristics, superior storage characteristics, and superior cycle characteristics are obtained. One thereof may be used singly, or two or more thereof may be used by mixing. Specially, the solvent preferably contains a mixture of a high-viscosity solvent such as ethylene carbonate and propylene carbonate and a low-viscosity solvent such as dimethyl carbonate, ethyl methyl carbonate, and diethyl carbonate. Thereby, the dissociation property of the electrolyte salt and the ion mobility are improved, and thus higher effects can be obtained.

In particular, the solvent preferably contains halogenated ester carbonate, since thereby a stable coat is formed on the surface of the anode 22, and thus the decomposition reaction of the electrolytic solution is prevented and the cycle characteristics are improved. As the halogenated ester carbonate, fluorinated ester carbonate is preferable, and difluoroethylene carbonate is particularly preferable, since thereby higher effects can be obtained. As difluoroethylene carbonate, for example, 4,5-difluoro-1,3-dioxolane-2-one can be cited.

Further, the solvent preferably contains cyclic ester carbonate having an unsaturated bond, since thereby the cycle characteristics are improved. As the cyclic ester carbonate having an unsaturated bond, for example, vinylene carbonate, vinyl ethylene carbonate and the like can be cited.

Further, the solvent preferably contains sultone, since thereby the cycle characteristics are improved, and the secondary battery is prevented from being swollen. As the sultone, for example, 1,3-propene sultone or the like can be cited.

The electrolyte salt contains, for example, one or more light metal salts such as a lithium salt. As the lithium salt, for example, lithium hexafluorophosphate ($LiPF_6$), lithium perchlorate ($LiClO_4$), lithium hexafluoroarsenate ($LiAsF_6$) or the like can be cited. Thereby, superior capacity characteristics, superior storage characteristics, and superior cycle characteristics are obtained. One thereof may be used singly, or two or more thereof may be used by mixing. Specially, as the electrolyte salt, lithium hexafluorophosphate is preferable, since the internal resistance is lowered, and thus higher effects can be obtained.

Specially, the electrolyte salt preferably contains a compound having boron or fluorine as an element, since thereby the cycle characteristics are improved. As the compound having boron and fluorine as an element, for example, lithium tetrafluoroborate can be cited.

The content of the electrolyte salt in the solvent is, for example, in the range from 0.3 mol/kg to 3.0 mol/kg since thereby superior capacity characteristics can be obtained.

The secondary battery can be manufactured, for example, by the following procedure.

First, the cathode 21 is formed. That is, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by using a doctor blade, a bar coater or the like, which is dried. Finally, the resultant is compression-molded by a rolling press machine while being heated if necessary to form the cathode active material layer 21B. In this case, the resultant may be compression molded over several times.

Then, the anode 22 is formed. That is, the anode active material layer 22B is formed on the both faces of the anode current collector 22A by a procedure similar to the procedure of forming the anode described above. After that, the coating layer 22C is formed so that the anode active material layer 22B is coated with the coating layer 22C.

Next, the battery element 20 is formed. That is, the cathode lead 24 and the anode lead 25 are respectively attached to the cathode current collector 21A and the anode current collector 22A by welding or the like. Subsequently, the cathode 21 and the anode 22 are layered with the separator 23 in between, and spirally wound several times in the longitudinal direction. Finally, the resultant is formed in the flat shape, and thereby the battery element 20 is formed.

Finally, the secondary battery is assembled. That is, after the battery element 20 is contained inside the battery can 11, the insulating plate 12 is arranged on the battery element 20. Subsequently, the cathode lead 24 and the anode lead 25 are respectively connected to the cathode pin 15 and the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery shown in FIG. 2 to FIG. 4 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, when the anode active material layer 22B contains the anode active material having silicon as an element, the anode active material layer 22B is coated with the coating layer 22C containing the oxide of the 3d transition metal element. Therefore, when charged and discharged, the reversible coat made of the lithium oxide is formed on the surface of the anode 22. More specifically, for example, when the coating layer 22C is made of cobalt I oxide (CoO), the reversible reaction shown in the following Chemical formula 1 is generated in the vicinity of the surface of the anode 22. Therefore, while forming and decomposing the coat ($Li_2O$), lithium ions travel between the cathode 21 and the anode 22 repeatedly. In Chemical formula 1, the left side represents discharged state, and the right side represents the charged state. Thereby, lithium as the electrode reactant is easily inserted in the anode 22 or is easily extracted from the anode 22, and the absolute number of lithium is prevented from being decreased. Accordingly, the cycle characteristics can be improved. In this case, when the anode active material contains silicon advantageous for obtaining a high capacity as an element, the cycle characteristics can be improved, and thus higher effects can be thereby obtained compared to a case in which the anode active material contains other anode material such as a carbon material.

$$CoO + 2Li^+ \leftrightarrows Co^{2+} + Li_2O \qquad \text{Chemical formula 1}$$

In particular, when the solvent of the electrolytic solution contains fluorinated ester carbonate, cyclic ester carbonate having an unsaturated bond, or sultone, higher effects can be obtained. When the solvent of the electrolytic solution contains sultone, the swollenness characteristics can be also improved. Further, when the electrolyte salt of the electrolytic solution contains the compound having boron or fluorine as an element, higher effects can be obtained.

Further, when the cathode 21, the anode 22, and the electrolytic solution are contained inside the battery can 11, the swollenness characteristics can be more improved. In this case, when the battery structure of the secondary battery is square, the swollenness easily becomes obvious when charged and discharged, and thus significant effects can be obtained in this case. Further, when the battery can 11 is made of iron, an iron alloy or the like that is more rigid than aluminum, higher effects can be obtained.

Other effects for the secondary battery are similar to those for the foregoing anode.

Second Battery

Figure 5:
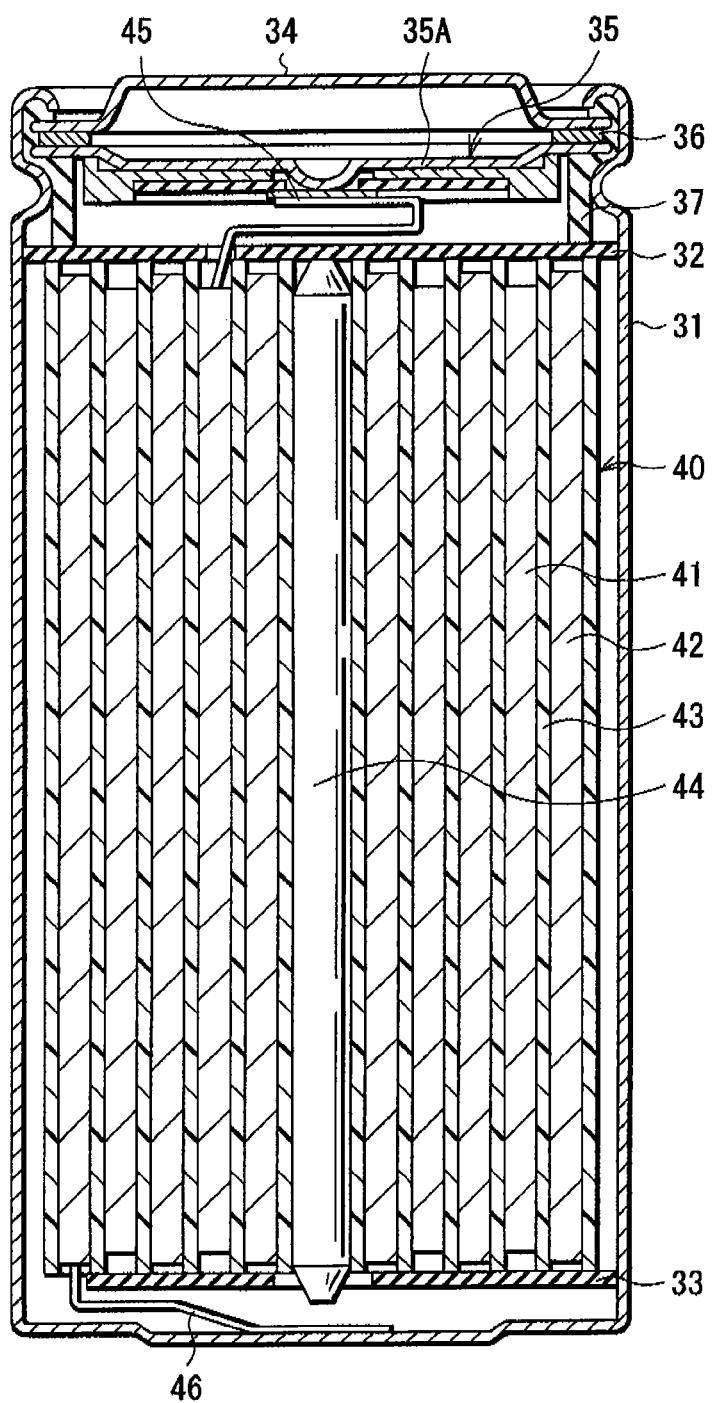
FIG. 5 is a cross section showing a structure of a second battery including the anode according to the embodiment.
Figure 6:
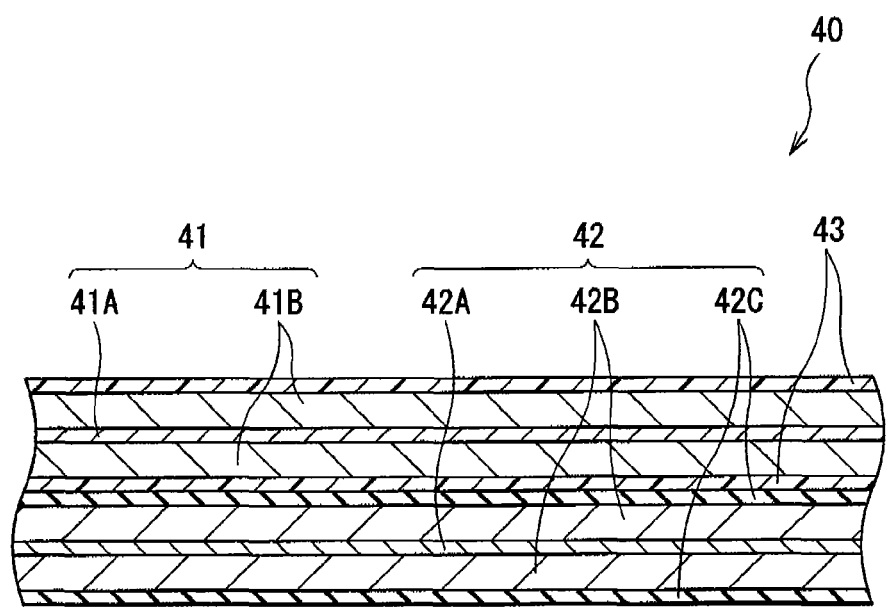
FIG. 6 is a cross section showing an enlarged part of a spirally wound electrode body shown in FIG. 5.

FIG. 5 and FIG. 6 show a cross sectional structure of a second battery. FIG. 6 shows an enlarged part of a spirally wound electrode body 40 shown in FIG. 5. The battery is a lithium ion secondary battery as the foregoing first battery. The second battery contains the spirally wound electrode body 40 in which a cathode 41 and an anode 42 are spirally wound with a separator 43 in between, and a pair of insulating plates 32 and 33 inside a battery can 31 in the shape of an approximately hollow cylinder. The battery structure including the battery can 31 is a so-called cylindrical secondary battery.

The battery can 31 is made of, for example, a metal material similar to that of the battery can 11 in the foregoing first battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 through the PTC device 36. In the safety valve mechanism 35, when the internal pressure of the battery becomes a certain level or more by internal short circuit, external heating or the like, a disk plate 35A flips to cut the electric connection between the battery cover 34 and the spirally wound electrode body 40. When temperature rises, the PTC device 36 increases the resistance and thereby limits a current to prevent abnormal heat generation resulting from a large current. The gasket 37 is made of, for example, an insulating material and its surface is coated with asphalt.

For example, a center pin 44 is inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on the both faces of a strip-shaped cathode current collector 41A. The anode 42 has a structure similar to that of the foregoing anode, for example, a structure in which an anode active material layer 42B and a coating layer 42C are provided on the both faces of a strip-shaped anode current collector 42A. The structures of the cathode current collector 41A, the cathode active material layer 41B, the anode current collector 42A, the anode active material layer 42B, the coating layer 42C, the separator 43, and the composition of the electrolytic solution are respectively similar to the structures of the cathode current collector 21A, the cathode active material layer 21B, the anode current collector 22A, the anode active material layer 22B, the coating layer 22C, the separator 23, and the composition of the electrolytic solution in the foregoing first battery.

The secondary battery can be manufactured, for example, as follows.

First, for example, the cathode 41 in which the cathode active material layer 41B is provided on the both faces of the cathode current collector 41A is formed and the anode 42 in which the anode active material layer 42B and the coating layer 42C are provided on the both faces of the anode current collector 42A is formed by respective procedures similar to the procedures for forming the cathode 21 and the anode 22 in the foregoing first battery. Subsequently, the cathode lead 45 is attached to the cathode 41, and the anode lead 46 is attached to the anode 42. Subsequently, the cathode 41 and the anode 42 are spirally wound with the separator 43 in between, and thereby the spirally wound electrode body 40 is formed. The end of the cathode lead 45 is welded to the safety valve mechanism 35, and the end of the anode lead 46 is welded to the battery can 31. After that, the spirally wound electrode body 40 is sandwiched between the pair of insulating plates 32 and 33, and contained inside the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery shown in FIG. 5 and FIG. 6 is thereby completed.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, when the anode active material layer 42B contains the anode active material having silicon as an element, the anode active material layer 42B is coated with the coating layer 42C containing the oxide of the 3d transition metal element. Thus, the cycle characteristics can be improved. The other effects for the secondary battery are similar to those of the first battery.

Third Battery

Figure 7:
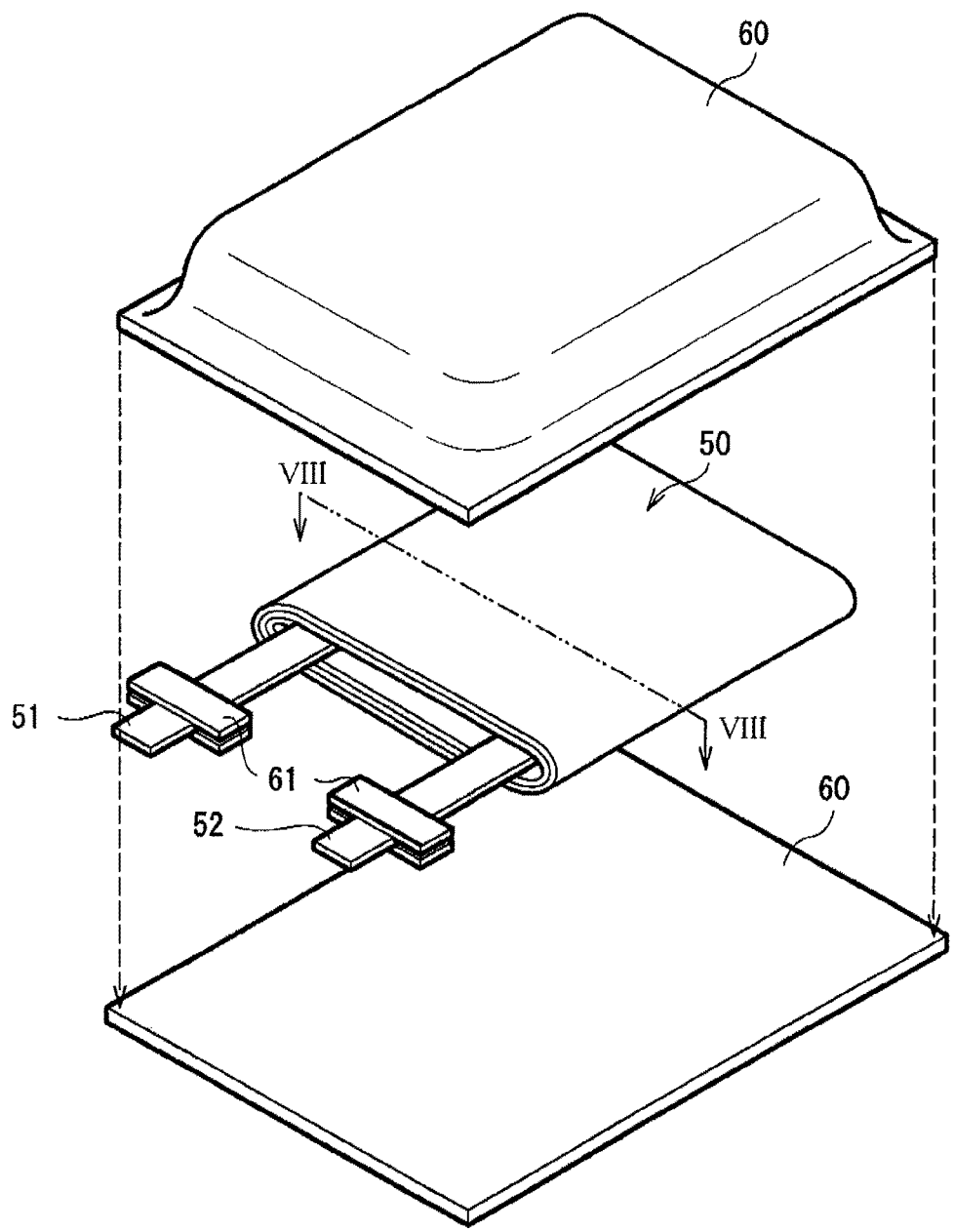
FIG. 7 is cross section showing a structure of a third battery including the anode according to the embodiment.
Figure 8:
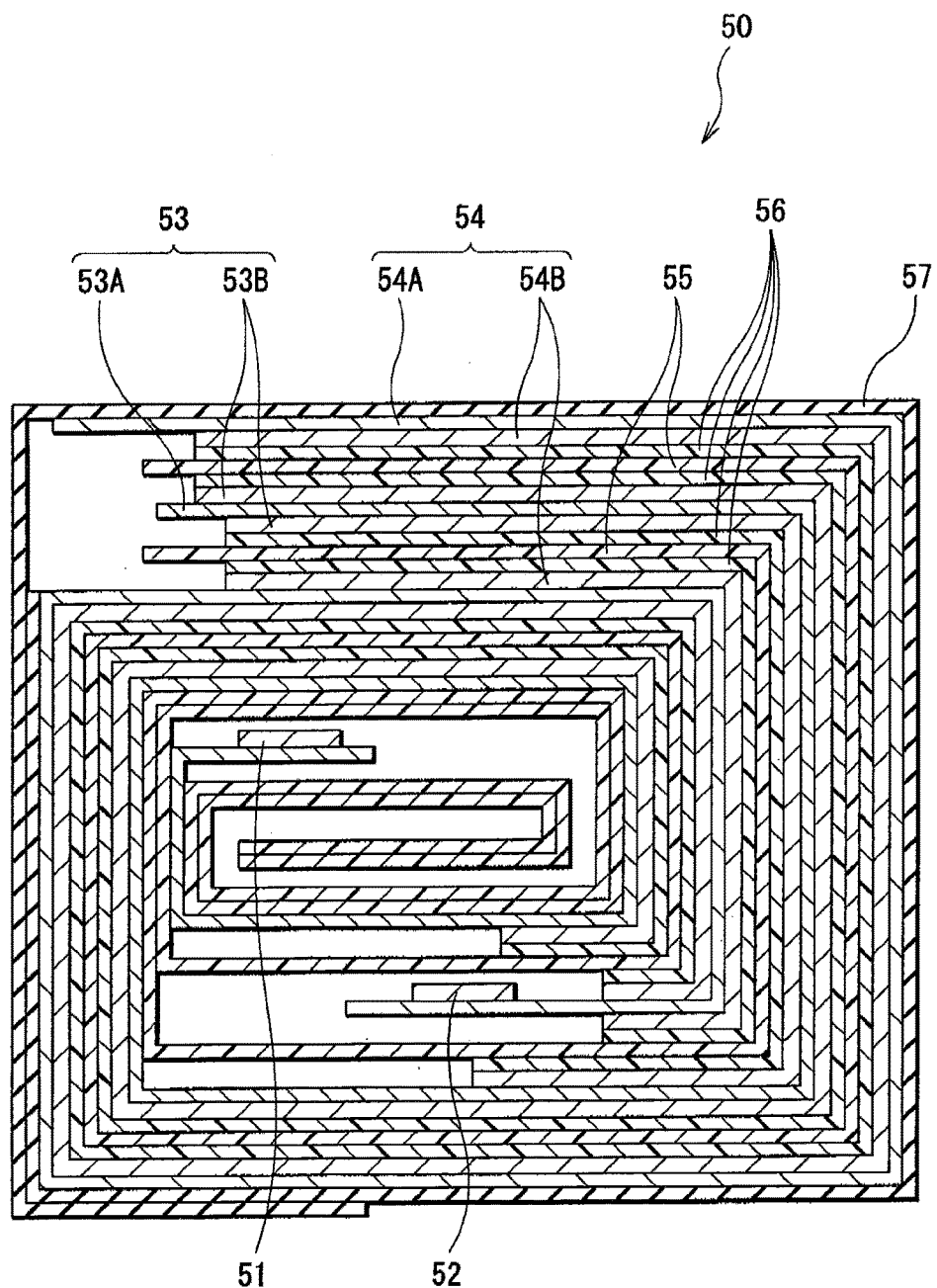
FIG. 8 is a cross section taken along line VIII-VIII of a spirally wound electrode body shown in FIG. 7.
Figure 9:
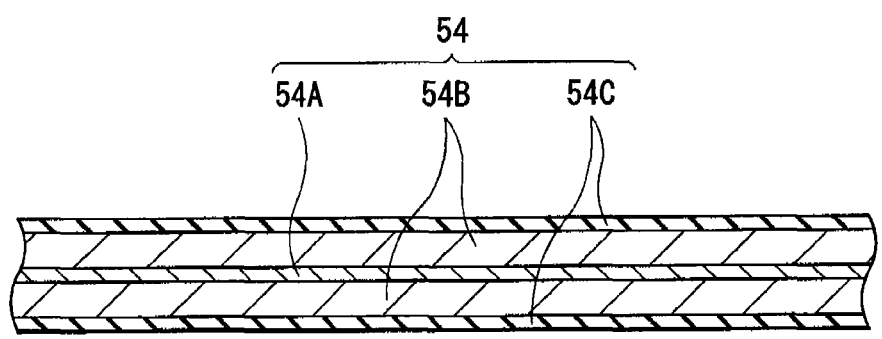
FIG. 9 is a cross section showing an enlarged part of the anode shown in FIG. 8.

FIG. 7 shows an exploded perspective structure of a third battery. FIG. 8 shows a cross section taken along line VIII-VIII shown in FIG. 7. FIG. 9 shows an exploded part of an anode 54 shown in FIG. 8. In the battery, a spirally wound electrode body 50 on which a cathode lead 51 and an anode lead 52 are attached is contained inside a film package member 60. The battery structure including the package member 60 is a so-called laminated film type structure.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. The cathode lead 51 and the anode lead 52 are in the shape of a thin plate or mesh.

The package member 60 is made of an aluminum laminated film in which, for example, a nylon film, an aluminum foil, and a polyethylene film are bonded together in this order. The package member 60 is, for example, arranged so that the polyethylene film and the spirally wound electrode body 50 are opposed to each other, and the respective outer edges of two pieces of rectangle aluminum laminated films are bonded to each other by fusion bonding or an adhesive.

An adhesive film 61 to protect from entering of outside air is inserted between the package member 60 and the cathode lead 51, the anode lead 52. The adhesive film 61 is made of a material having contact characteristics to the cathode lead 51 and the anode lead 52, for example, and is made of a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and the anode 54 are layered with a separator 55 and an electrolyte 56 in between and then spirally wound. The outermost periphery thereof is protected by a protective tape 57.

The cathode 53 has a structure in which, for example, a cathode active material layer 53B is provided on the both faces of a cathode current collector 53A having a pair of opposed faces. The anode 54 has a structure similar to that of the foregoing anode, for example, has a structure in which an anode active material layer 54B and a coating layer 54C are provided on the both faces of a strip-shaped anode current collector 54A. The structures of the cathode current collector 53A, the cathode active material layer 53B, the anode current collector 54A, the anode active material layer 54B, the coating layer 54C, and the separator 55 are respectively similar to those of the cathode current collector 21A, the cathode active material layer 21B, the anode current collector 22A, the anode active material layer 22B, the coating layer 22C, and the separator 23 of the foregoing first battery. In FIG. 8, the coating layer 54C is not shown.

The electrolyte 56 is so-called gelatinous, containing an electrolytic solution and a polymer compound that holds the electrolytic solution. The gel electrolyte is preferable, since high ion conductivity (for example, 1 mS/cm or more at room temperature) can be obtained and liquid leakage of the battery can be prevented. The electrolyte 56 is provided, for example, between the cathode 53 and the separator 55, and between the anode 54 and the separator 55.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like can be cited. One of these polymer compounds may be used singly, or two or more thereof may be used by mixing. Specially, polyacrylonitrile, polyvinylidene fluoride, polyhexafluoropropylene, polyethylene oxide or the like is preferably used as the polymer compound, since thereby the electrochemical stability can be obtained.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

Instead of the electrolyte 56 in which the electrolytic solution is held by the polymer compound, the electrolytic solution may be directly used. In this case, the electrolytic solution is impregnated in the separator 55.

The battery including the gel electrolyte 56 is manufactured, for example, as follows.

First, the cathode 53 in which the cathode active material layer 53B is provided on the both faces of the cathode current collector 53A is formed and the anode 54 in which the anode active material layer 54B and the coating layer 54C are provided on the both faces of the anode current collector 54A is formed by respective procedures similar to the foregoing procedures for forming the cathode 21 and the anode 22 in the foregoing first battery. Subsequently, a precursor solution containing the electrolytic solution, a polymer compound, and a solvent is prepared. Then, the cathode 53 and the anode 54 are respectively coated with the precursor solution. After that, the solvent is volatilized to form the gel electrolyte 56. Subsequently, the cathode lead 51 is attached to the cathode current collector 53A, and the anode lead 52 is attached to the anode current collector 54A. Subsequently, the cathode 53 and the anode 54 formed with the electrolyte 56 are layered with the separator 55 in between to obtain a lamination. After that, the lamination is spirally wound in the longitudinal direction, the protective tape 57 is adhered to the outermost periphery thereof to form the spirally wound electrode body 50. Subsequently, for example, the spirally wound electrode body 50 is sandwiched between the package members 60, and outer edges of the package members 60 are contacted by thermal fusion bonding or the like to enclose the spirally wound electrode body 50. Then, the adhesive film 61 is inserted between the cathode lead 51/the anode lead 52 and the package member 60. Thereby, the secondary battery shown in FIG. 7 to FIG. 9 is completed.

Otherwise, the foregoing battery may be manufactured as follows. First, the cathode lead 51 and the anode lead 52 are respectively attached on the cathode 53 and the anode 54. After that, the cathode 53 and the anode 54 are layered with the separator 55 in between and spirally wound. The protective tape 57 is adhered to the outermost periphery thereof, and a spirally wound body as a precursor of the spirally wound electrode body 50 is formed. Subsequently, the spirally wound body is sandwiched between the package members 60, the peripheral edges other than one side of the peripheral edges are contacted by thermal fusion-bonding or the like to obtain a pouched state, and the spirally wound body is contained inside the pouched-like package member 60. Subsequently, a composition of matter for electrolyte containing the electrolytic solution, a monomer as a raw material for a polymer compound, a polymerization initiator, and if necessary other material such as a polymerization inhibitor is prepared, which is injected into the pouched-like package member 60. After that, the opening of the package member 60 is hermetically sealed by, for example, thermal fusion bonding or the like. Finally, the monomer is thermally polymerized to obtain a polymer compound. Thereby, the gel electrolyte 56 is formed. Consequently, the secondary battery shown in FIG. 7 to FIG. 9 is completed.

According to the laminated film type secondary battery, when the anode active material layer 54B contains the anode active material having silicon as an element, the anode active material layer 54B is coated with the coating layer 54C containing the oxide of the 3d transition metal element. Thus, the cycle characteristics can be improved. The other effects of the secondary battery are similar to those of the first battery.

EXAMPLES

Specific examples of the invention will be described in detail.

Example 1-1

The laminated film type secondary battery shown in FIG. 7 to FIG. 9 was fabricated. The secondary battery was fabricated as a lithium ion secondary battery in which the capacity of the anode 54 was expressed by the capacity component based on insertion and extraction of lithium.

First, the cathode 53 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone to obtain paste cathode mixture slurry. Finally, the both faces of the cathode current collector 53A made of a strip-shaped aluminum foil (being 12 μm thick) were uniformly coated with the cathode mixture slurry, which was dried. After that, the resultant was compression-molded by a roll pressing machine to form the cathode active material layer 53B. After that, the cathode lead 51 made of aluminum was welded to one end of the cathode current collector 53A.

Next, the anode 54 was formed. That is, the anode current collector 54A (ten point height of roughness profile Rz: 3.5 μm) made of an electrolytic copper foil was prepared. After that, silicon as an anode active material was deposited on the both faces of the anode current collector 54A by electron beam evaporation method by using deflective electron beam evaporation source while continuously introducing oxygen gas and if necessary introducing moisture vapor into a chamber. Thereby, the anode active material layer 54B was formed. At that time, silicon with the purity of 99% was used as the evaporation source, the deposition rate was 100 nm/sec, and the oxygen content in the anode active material was 3 atomic %. Subsequently, cobalt I oxide (CoO) was deposited on the surface of the anode active material layer 54B by similar electron beam evaporation method, and thereby the coating layer 54C was formed. At that time, cobalt I oxide with the purity of 99.9% was used as the evaporation source, the deposition rate was 20 nm/sec, and the thickness of the coating layer 54C was 5 nm. For the completed anode 54, the cross section was exposed by FIB (Focused Ion Beam etching), and then local element analysis was performed by AES (Auger Electron Spectrometer). In the result, it was confirmed that the element of the anode current collector 54A and the element of the anode active material layer 54B were diffused into each other at the interface between the anode current collector 54A and the anode active material layer 54B, that is, alloying was confirmed. After that, the anode lead 52 made of nickel was welded to one end of the anode current collector 54A.

Next, the cathode 53, the three-layer polymer separator 55 (thickness: 23 μm) in which a porous polyethylene film is sandwiched between porous polypropylene films, and the anode 54 were layered in this order. The resultant lamination was spirally wound many times in the longitudinal direction, the end portion of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a laminated film having three-layer structure (total thickness: 100 μm) in which nylon (being 30 μm thick), aluminum (being 40 μm thick), and non-stretched polypropylene (being 30 μm thick) were layered from the outside. After that, the outer edges other than the edge of one side of the package members were thermally fusion-bonded to each other. Thereby, the spirally wound body was contained inside the package members 60 in a pouched state. Subsequently, the electrolytic solution was injected through the opening of the package member 60, the electrolytic solution was impregnated in the separator 55, and thereby the spirally wound electrode body 50 was formed.

When the electrolytic solution was prepared, a mixed solvent of ethylene carbonate (EC) and diethyl carbonate (DEC) as a solvent was used, and lithium hexafluorophosphate ($LiPF_6$) was used as an electrolyte salt. The composition of the mixed solvent (EC:DEC) was 50:50 at a weight ratio. The concentration of the electrolyte salt was 1 mol/kg.

Finally, the opening of the package member 60 was thermally fusion-bonded and sealed in the vacuum atmosphere. Thereby, the laminated film type secondary battery was completed.

Examples 1-2 to 1-8

A procedure was performed in the same manner as that of Example 1-1, except that the thickness of the coating layer 54C was changed to 10 nm (Example 1-2), 50 nm (Example 1-3), 100 nm (Example 1-4), 1000 nm (Example 1-5), 2000 nm (Example 1-6), 3000 nm (Example 1-7), or 4000 nm (Example 1-8) instead of 5 nm.

Examples 1-9 to 1-12

A procedure was performed in the same manner as that of Example 1-1, except that cobalt III oxide ($Co_3O_4$) was used instead of cobalt I oxide as a material for forming the coating layer 54C, and the thickness of the coating layer 54C was changed to 10 nm (Example 1-9), 100 nm (Example 1-10), 1000 nm (Example 1-11), or 2000 nm (Example 1-12) instead of 5 nm.

Examples 1-13 to 1-16

A procedure was performed in the same manner as that of Example 1-1, except that iron I oxide (FeO) was used instead of cobalt I oxide as a material for forming the coating layer 54C, and the thickness of the coating layer 54C was changed to 10 nm (Example 1-13), 100 nm (Example 1-14), 1000 nm (Example 1-15), or 2000 nm (Example 1-16) instead of 5 nm.

Examples 1-17 and 1-18

A procedure was performed in the same manner as that of Example 1-1, except that iron II oxide ($Fe_2O_3$) was used instead of cobalt I oxide as a material for forming the coating layer 54C, and the thickness of the coating layer 54C was changed to 10 nm (Example 1-17) or 1000 nm (Example 1-18) instead of 5 nm.

Examples 1-19 and 1-20

A procedure was performed in the same manner as that of Example 1-1, except that iron III oxide ($Fe_3O_4$) was used instead of cobalt I oxide as a material for forming the coating layer 54C, and the thickness of the coating layer 54C was changed to 10 nm (Example 1-19) or 1000 nm (Example 1-20) instead of 5 nm.

Examples 1-21 and 1-22

A procedure was performed in the same manner as that of Example 1-1, except that nickel I oxide (NiO) was used instead of cobalt I oxide as a material for forming the coating layer 54C, and the thickness of the coating layer 54C was changed to 10 nm (Example 1-21) or 1000 nm (Example 1-22) instead of 5 nm.

Comparative Example 1

A procedure was performed in the same manner as that of Example 1-1, except that the coating layer 54C was not formed on the surface of the anode active material layer 54B.

When the cycle characteristics of the secondary batteries of Examples 1-1 to 1-22 and Comparative example 1 were examined, the results shown in Table 1 were obtained.

In examining the cycle characteristics, the secondary battery was charged and discharged by the following procedure, and thereby the discharge capacity retention ratio was obtained. First, to stabilize the battery state, after charge and discharge were performed 1 cycle in the atmosphere of 23 deg C., charge and discharge were performed again. Thereby, the discharge capacity at the second cycle was measured. Subsequently, the secondary battery was charged and discharged 99 cycles in the same atmosphere, and thereby the discharge capacity at the 101st cycle was measured. Finally, the discharge capacity retention ratio (%)= (discharge capacity at the 101st cycle/discharge capacity at the second cycle)×100 was calculated. The charge condition was as follows. That is, after charge was performed at the constant current density of 3 $mA/cm^2$ until the battery voltage reached 4.2 V, charge was continuously performed at the constant voltage of 4.2 V until the battery density reached 0.3 $mA/cm^2$. The discharge condition was as follows. That is, discharge was performed at the constant current density of 3 $mA/cm^2$ until the battery voltage reached 2.5 V.

The procedure, the conditions and the like for examining the cycle characteristics were similarly applied for evaluating the same characteristics of the following examples and comparative examples.

TABLE 1

Anode active material: silicon (electron beam evaporation method)
Oxygen content: 3 atomic %; ten point height of roughness profile Rz: 3.5 μm

| | Coating layer ($M_xO_y$) | | | | | Discharge capacity retention ratio (%) |
|---|---|---|---|---|---|---|
| | Type | M | x | y | Thickness (nm) | |
| Example 1-1 | CoO | Co | 1 | 1 | 5 | 64 |
| Example 1-2 | | | | | 10 | 84 |
| Example 1-3 | | | | | 50 | 86 |
| Example 1-4 | | | | | 100 | 88 |
| Example 1-5 | | | | | 1000 | 89 |
| Example 1-6 | | | | | 2000 | 88 |
| Example 1-7 | | | | | 3000 | 82 |
| Example 1-8 | | | | | 4000 | 67 |
| Example 1-9 | $Co_3O_4$ | Co | 3 | 4 | 10 | 82 |
| Example 1-10 | | | | | 100 | 84 |
| Example 1-11 | | | | | 1000 | 85 |
| Example 1-12 | | | | | 2000 | 84 |
| Example 1-13 | FeO | Fe | 1 | 1 | 10 | 80 |
| Example 1-14 | | | | | 100 | 82 |
| Example 1-15 | | | | | 1000 | 83 |
| Example 1-16 | | | | | 2000 | 82 |
| Example 1-17 | $Fe_2O_3$ | Fe | 2 | 3 | 100 | 79 |
| Example 1-18 | | | | | 1000 | 81 |
| Example 1-19 | $Fe_3O_4$ | Fe | 2 | 3 | 100 | 78 |
| Example 1-20 | | | | | 1000 | 80 |
| Example 1-21 | NiO | Ni | 1 | 1 | 100 | 81 |
| Example 1-22 | | | | | 1000 | 82 |
| Comparative example 1 | — | — | — | — | — | 52 |

As shown in Table 1, in Examples 1-1 to 1-22 in which the coating layer 54C was formed, the discharge capacity retention ratio was higher than that of Comparative example 1 in which the coating layer 54C was not formed, without depending on the type of an oxide ($M_xO_y$) composing the coating layer 54C. Accordingly, it was confirmed that in the secondary battery including the anode active material layer 54B, the cycle characteristics were improved by providing the coating layer 54C containing the oxide of the 3d transition metal element on the surface of the anode active material layer 54B.

In particular, when comparison was made among Examples 1-1 to 1-22 for the discharge capacity retention ratio according to the type of the 3d transition metal element (M), the following results were obtained. When the 3d transition metal element was cobalt, the discharge capacity retention ratio of Examples 1-2 and 1-4 to 1-6 in which cobalt I oxide was used was higher than that of Examples 1-9 to 1-12 in which cobalt III oxide was used. When the 3d transition metal element was iron, the discharge capacity retention ratio of Examples 1-14 and 1-15 in which iron I oxide was used was higher than that of Examples 1-17 to 1-20 in which iron II oxide or iron III oxide was used. Accordingly, it was confirmed that in the foregoing secondary battery, when the oxide ($M_xO_y$) composing the coating layer 54C was the compound in which x was 1 and y was 1, that is, the oxide was cobalt I oxide, iron I oxide, or nickel I oxide, hither effects were obtained.

Further, in Examples 1-1 to 1-8, there was a tendency that as the thickness of the coating layer 54C was larger, the discharge capacity retention ratio was increased, and then decreased. In this case, when the thickness was smaller than 10 nm or larger than 3000 nm, the discharge capacity retention ratio was largely decreased. Accordingly, it was confirmed that in the foregoing secondary battery, when the thickness of the coating layer 54C was in the range from 10 nm to 3000 nm, higher effects were obtained.

Figure 10A:
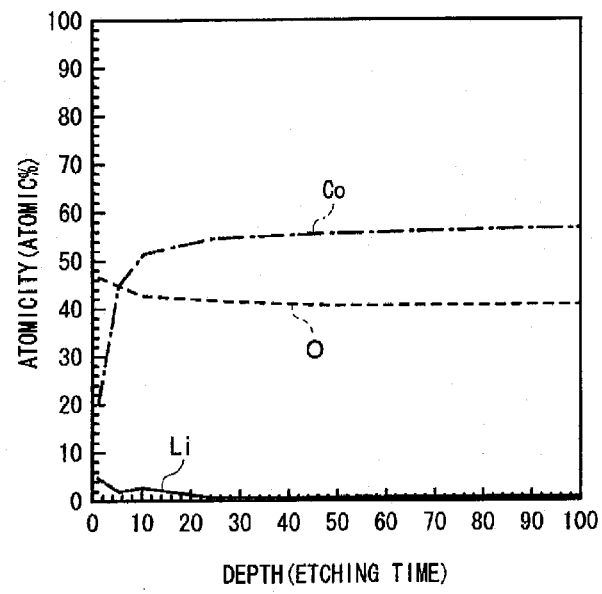
FIGS. 10A and 10B are diagrams showing depth analysis results.
Figure 10B:
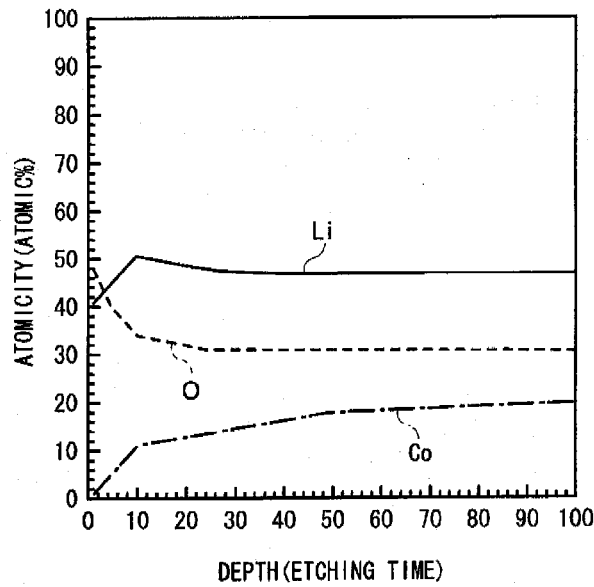

As a representative of Examples 1-1 to 1-22, the surface of the anode 54 in the secondary battery in Example 1-5 in which the coating layer 54C was made of cobalt I oxide was analyzed by ESCA (Electron Spectroscopy for Chemical Analysis), the result shown in FIGS. 10A and 10B were obtained. FIGS. 10A and 10B are depth analysis results by ESCA (horizontal axis: depth (etching time); vertical axis: atomicity (atomic %)). FIG. 10A shows the discharge state and FIG. 10B shows the charge state. In FIGS. 10A and 10B, full lines represent lithium, dashed lines represent cobalt, and dotted lines represent oxygen, respectively.

In the secondary battery of Example 1-5, first, in the discharged state, as shown in FIG. 10A, the atomicity of cobalt and oxygen was larger than the atomicity of lithium, and the atomicity of lithium was almost close to 0. The result shows that as shown in the left side of the foregoing Chemical formula 1, the coating layer 54C made of cobalt I oxide exists on the surface of the anode 54, and lithium is hardly inserted in the anode 54. Subsequently, when the discharged state is shifted to charged state, as shown in FIG. 10B, a large part of cobalt is replaced with lithium, and thereby the atomicity of lithium and oxygen was larger than the atomicity of cobalt. The result shows that as shown in the right side of the foregoing Chemical formula 1, a coat made of lithium oxide was formed on the surface of the anode 54. After that, when the charged state is returned back to the discharged state, the result shown in FIG. 10A was obtained again. The result shows that the coat made of lithium oxide formed on the surface of the anode 54 in the charged state is reversible. The description has been herein given of only the depth analysis result by ESCA in the case using cobalt I oxide as a material for forming the coating layer 54C. However, when the depth analysis by ESCA was also performed for a case using other cobalt oxide such as iron III oxide or other oxide of the 3d transition element such as iron I oxide and nickel I oxide, similar effects were obtained. Accordingly, it was confirmed that by forming the coating layer 54C with the use of the oxide of the 3d transition metal element, the reversible coat made of lithium oxide was formed on the surface of the anode 54 when charged and discharged, and thereby lithium repeatedly traveled between the cathode 53 and the anode 54.

Examples 2-1 to 2-7

A procedure was performed in the same manner as that of Example 1-5, except that the oxygen content in the anode active material was changed to 1.5 atomic % (Example 2-1), 5 atomic % (Example 2-2), 10 atomic % (Example 2-3), 20 atomic % (Example 2-4), 30 atomic % (Example 2-5), 40 atomic % (Example 2-6), or 50 atomic % (Example 2-7) instead of 3 atomic %.

When the cycle characteristics of the secondary batteries of Examples 2-1 to 2-7 were examined, the results shown in Table 2 were obtained. Table 2 also shows the results of Example 1-5 and Comparative example 1.

TABLE 2

Anode active material: silicon (electron beam evaporation method)
ten point height of roughness profile Rz = 3.5 μm

| | Anode active material layer | Coating layer | | Discharge capacity |
| --- | --- | --- | --- | --- |
| | Oxygen content (atomic %) | Type | Thickness (nm) | retention ratio (%) |
| Example 2-1 | 1.5 | CoO | 1000 | 82 |
| Example 1-5 | 3 | | | 89 |
| Example 2-2 | 5 | | | 90 |
| Example 2-3 | 10 | | | 91 |
| Example 2-4 | 20 | | | 91 |
| Example 2-5 | 30 | | | 91 |
| Example 2-6 | 40 | | | 89 |
| Example 2-7 | 50 | | | 81 |
| Comparative example 1 | — | — | — | 52 |

As shown in Table 2, as in Example 1-5, the discharge capacity retention ratio of Examples 2-1 to 2-7 in which the oxygen content in the anode active material was different was higher than that of Comparative example 1. Accordingly, it was confirmed that in the secondary battery in which the coating layer 54C was provided on the anode active material layer 54B, even when the oxygen content in the anode active material was changed, the cycle characteristics were improved.

In particular, in Examples 1-5 and 2-1 to 2-7, there was a tendency that as the oxygen content became larger, the discharge capacity retention ratio was increased, and then decreased. In this case, when the oxygen content was smaller than 3 atomic % or larger than 40 atomic %, the discharge capacity retention ratio was largely decreased. Accordingly, it was confirmed that in the foregoing secondary battery, when the oxygen content in the anode active material was in the range from 3 atomic % to 40 atomic %, higher effects were obtained.

Examples 3-1 to 3-4

A procedure was performed in the same manner as that of Example 1-5, except that the anode active material layer 54B was formed so that the first oxygen-containing layer and the second oxygen-containing layer having the oxygen content higher than that of the first oxygen-containing layer were alternately layered by depositing silicon while intermittently introducing oxygen gas or the like into the chamber instead of making oxygen being contained in the anode active material by depositing silicon by continuously introducing oxygen gas into the chamber. The oxygen content in the second oxygen-containing layer was 3 atomic %, and the number of the layers was 1 (Example 3-1), 2 (Example 3-2), 3 (Example 3-3), or 4 (Example 3-4).

When the cycle characteristics of the secondary batteries of Examples 3-1 to 3-4 were examined, the results shown in Table 3 were obtained. Table 3 also shows the results of Example 1-5 and Comparative example 1.

TABLE 3

Anode active material: silicon (electron beam evaporation method)
Oxygen content = 3 atomic %; ten point height of roughness profile
Rz = 3.5 μm

| | Anode active material layer No. of layers of second oxygen-containing layer | Coating layer Type | Thickness (nm) | Discharge capacity retention ratio (%) |
|---|---|---|---|---|
| Example 1-5 | — | CoO | 1000 | 89 |
| Example 3-1 | 1 | | | 90 |
| Example 3-2 | 2 | | | 91 |
| Example 3-3 | 3 | | | 92 |
| Example 3-4 | 4 | | | 93 |
| Comparative example 1 | — | — | — | 52 |

As shown in Table 3, as in Example 1-5, the discharge capacity retention ratio of Examples 3-1 to 3-4 in which the anode active material layer 54B had the first and the second oxygen-containing layers was higher than that of Comparative example 1 as well. Accordingly, it was confirmed that in the secondary battery in which the coating layer 54C was provided on the anode active material layer 54B, even when the anode active material 54B was formed to have the first and the second oxygen-containing layers, the cycle characteristics were improved.

In particular, the discharge capacity retention ratio of Examples 3-1 to 3-4 was higher than that of Example 1-5. Further, in these cases, there was a tendency that the discharge capacity retention ratio became larger in the order of Example 3-1 including one second oxygen-containing layer, Example 3-2 including two second oxygen-containing layers, Example 3-3 including three second oxygen-containing layers, and Example 3-4 including four second oxygen-containing layers. Accordingly, it was confirmed that in the foregoing secondary battery, the higher effects were obtained by forming the anode active material layer 54B to have the first and the second oxygen-containing layers, and still higher effects were obtained by increasing the number of layers of the second oxygen-containing layer.

Example 4-1 to 4-5

A procedure was performed in the same manner as that of Example 1-5, except that by using a mixture of silicon and a metal element instead of silicon with the purity of 99% as the evaporation source, the anode active material layer 54B containing an anode active material having such a mixture as an element was formed. At that time, iron was used as the metal element, and the content of metal element in the anode active material was 3 atomic % (Example 4-1), 10 atomic % (Example 4-2), 20 atomic % (Example 4-3), 30 atomic % (Example 4-4), or 40 atomic % (Example 4-5).

Examples 4-6 to 4-9

A procedure was performed in the same manner as that of Example 4-2, except that cobalt (Example 4-6), nickel (Example 4-7), titanium (Example 4-8), or chromium (Example 4-9) was used instead of iron as the metal element.

When the cycle characteristics of the secondary batteries of Examples 4-1 to 4-9 were examined, the results shown in Table 4 were obtained. Table 4 also shows the results of Example 1-5 and Comparative example 1.

TABLE 4

Anode active material: silicon (electron beam evaporation method)
ten point height of roughness profile Rz = 3.5 μm

| | Anode active material layer | | Coating layer | | Discharge capacity retention ratio (%) |
|---|---|---|---|---|---|
| | Type | Content of metal element (atomic %) | Type | Thickness (nm) | |
| Example 1-5 | — | — | CoO | 1000 | 89 |
| Example 4-1 | Fe | 3 | | | 90 |
| Example 4-2 | | 10 | | | 92 |
| Example 4-3 | | 20 | | | 92 |
| Example 4-4 | | 30 | | | 92 |
| Example 4-5 | | 40 | | | 91 |
| Example 4-6 | Co | 10 | | | 92 |
| Example 4-7 | Ni | 10 | | | 91 |
| Example 4-8 | Ti | 10 | | | 93 |
| Example 4-9 | Cr | 10 | | | 91 |
| Comparative example 1 | — | — | — | — | 52 |

As shown in Table 4, as in Example 1-5, the discharge capacity retention ratio of examples 4-1 to 4-9 in which the anode active material contained the metal element as an element together with silicon was higher than that of Comparative example 1 as well. Accordingly, it was confirmed that in the secondary battery in which the coating layer 54C was provided on the anode active material layer 54B, even when the anode active material contained the metal element, the cycle characteristics were improved. Though no examples for a case using molybdenum as the metal element have been herein disclosed, when the case using molybdenum was similarly examined for the cycle characteristics, it was confirmed that the cycle characteristics were also improved.

In particular, the discharge capacity retention ratio of Examples 4-1 to 4-5 was higher than that of Example 1-5. In these cases, there was a tendency that as the content of metal element became larger, the discharge capacity retention ratio was increased and then decreased. In the case that the lower limit and the upper limit of the content were respectively 3 atomic % and 40 atomic %, the discharge capacity retention ratio was higher than that of Example 1-5. However, in Examples 4-1 to 4-5, when the thickness of the anode active material layer 54B was increased as the content of metal element was increased in order to secure a constant battery capacity even in the case that the anode active material contained the metal element, the thickness of the anode active material layer 54B of Example 4-5 was excessively thick, which was not practical. Accordingly, it was confirmed that in the foregoing secondary battery, the higher effects were obtained by forming the anode active material layer 54B to have the first and the second metal-element-containing layers, and still higher effects were obtained when the content of metal element in the anode active material was in the range from 3 atomic % to 40 atomic %, and preferably in the range from 3 atomic % to 30 atomic %.

Examples 5-1 to 5-4

A procedure was performed in the same manner as that of Example 1-5, except that the anode active material layer 54B was formed so that the first metal-element-containing layer and the second metal-element-containing layer having the content of metal element higher than that of the first metal-element-containing layer were alternately layered by alternately repeating a step of depositing silicon with the use of electron beam evaporation method and a step of depositing the metal element with the use of sputtering method. In the step of depositing the metal element with the use of sputtering method, plasma was generated in argon (Ar) gas, and the deposition rate was 0.8 mm/sec. At that time, iron was used as the metal element, and the number of layers of the second metal-element-containing layer was 1 (Example 5-1), 2 (Example 5-2), 3 (Example 5-3), or 4 (Example 5-4).

When the cycle characteristics of the secondary batteries of Examples 5-1 to 5-4 were examined, the results shown in Table 5 were obtained. Table 5 also shows the results of Example 1-5 and Comparative example 1.

TABLE 5

Anode active material: silicon (electron beam evaporation method)
Oxygen content = 3 atomic %; ten point height of roughness profile Rz = 3.5 μm

| | Anode active material layer | | Coating layer | | Discharge capacity retention ratio (%) |
|---|---|---|---|---|---|
| | Type of metal element | No. of layers of second metal-element containing layers | Type | Thickness (nm) | |
| Example 1-5 | Fe | — | CoO | 1000 | 89 |
| Example 5-1 | | 1 | | | 92 |
| Example 5-2 | | 2 | | | 93 |
| Example 5-3 | | 3 | | | 94 |
| Example 5-4 | | 4 | | | 95 |
| Comparative example 1 | — | — | — | | 52 |

As shown in Table 5, as in Example 1-5, the discharge capacity retention ratio of Examples 5-1 to 5-4 in which the anode active material layer 54B had the first and the second metal-element-containing layers was higher than that of Comparative example 1 as well. Accordingly, it was confirmed that in the secondary battery in which the coating layer 54C was provided on the anode active material layer 54B, even when the anode active material layer 54B was formed to have the first and the second metal-element-containing layers, the cycle characteristics were improved. Though no examples for a case using molybdenum as the metal element have been herein disclosed, when the case using molybdenum was examined for the cycle characteristics similarly, it was confirmed that the cycle characteristics were also improved.

In particular, the discharge capacity retention ratio of Examples 5-1 to 5-4 was higher than that of Example 1-5. Further, in these cases, there was a tendency that the discharge capacity retention ratio became higher, in the order of Example 5-1 including one second metal-element-containing layer, Example 5-2 including two second metal-element-containing layers, Example 5-3 including three second metal-element-containing layers, and Example 5-4 including four second metal-element-containing layers. Accordingly, it was confirmed that in the foregoing secondary battery, the higher effects were obtained by forming the anode active material layer 54B to have the first and the second metal-element-containing layers, and still higher effects were obtained by increasing the number of layers of the second metal-element-containing layer.

Examples 6-1 to 6-6

A procedure was performed in the same manner as that of Example 1-5, except that the ten point height of roughness profile Rz of the surface of the anode current collector 54A was 1 μm (Example 6-1), 1.5 μm (Example 6-2), 2.5 μm (Example 6-3), 4.5 μm (Example 6-4), 5 μm (Example 6-5), or 5.5 μm (Example 6-6) instead of 3.5 μm.

When the cycle characteristics of the secondary batteries of Examples 6-1 to 6-6 were examined, the results shown in Table 6 were obtained. Table 6 also shows the results of Example 1-5 and Comparative example 1.

TABLE 6

Anode active material: silicon (electron beam evaporation method)
Oxygen content = 3 atomic %

| | Anode active material layer ten point height of roughness profile Rz (μm) | Coating layer | | Discharge capacity retention ratio (%) |
|---|---|---|---|---|
| | | Type | Thickness (nm) | |
| Example 6-1 | 1 | CoO | 1000 | 78 |
| Example 6-2 | 1.5 | | | 83 |
| Example 6-3 | 2.5 | | | 85 |
| Example 1-5 | 3.5 | | | 89 |
| Example 6-4 | 4.5 | | | 88 |
| Example 6-5 | 5 | | | 87 |
| Example 6-6 | 5.5 | | | 80 |
| Comparative example 1 | — | — | — | 52 |

As shown in Table 6, as in Example 1-5, the discharge capacity retention ratio of Examples 6-1 to 6-6 in which the ten point height of roughness profile Rz was different was higher than that of Comparative example 1 as well. Accordingly, it was confirmed that in the secondary battery in which the coating layer 54C was provided on the anode active material layer 54B, even when the ten point height of roughness profile Rz of the surface of the anode current collector 54A was changed, the cycle characteristics were improved.

In particular, in Examples 1-5 and 6-1 to 6-6, there was a tendency that as the ten point height of roughness profile Rz became larger, the discharge capacity retention ratio was increased and then decreased. In this case, when the ten point height of roughness profile Rz was smaller than 1.5 μm or larger than 5 μm, the discharge capacity retention ratio was largely decreased. Accordingly, it was confirmed that in the foregoing secondary battery, when the ten point height of roughness profile Rz was in the range from 1.5 μm to 5 μm, higher effects were obtained.

Examples 7-1 and 7-2

A procedure was performed in the same manner as that of Example 1-5, except that the anode active material layer 54B was formed by repeating a step of forming a film over multiple times. The number of layers of the anode active material layer 54B was 3 (Example 7-1) or 5 (Example 7-2).

When the cycle characteristics of the secondary batteries of Examples 7-1 and 7-2 were examined, the results shown in Table 7 were obtained. Table 7 also shows the results of Example 1-5 and Comparative example 1.

TABLE 7

Anode active material: silicon (electron beam evaporation method)
Oxygen content = 3 atomic %; ten point height of roughness profile
Rz = 3.5 μm

| | Anode active material layer No. of layers | Coating layer Type | Thickness (nm) | Discharge capacity retention ratio (%) |
|---|---|---|---|---|
| Example 1-5 | 1 | CoO | 1000 | 89 |
| Example 7-1 | 3 | | | 90 |
| Example 7-2 | 5 | | | 91 |
| Comparative example 1 | — | — | — | 52 |

As shown in Table 7, as in Example 1-5, the discharge capacity retention ratio of Examples 7-1 and 7-2 in which the number of layers of the anode active material layer 54B was different was higher than that of Comparative example 1 as well. Accordingly, it was confirmed that in the secondary battery in which the coating layer 54C was provided on the anode active material layer 54B, even when the number of layers of the anode current collector 54A was changed, the cycle characteristics were improved.

In particular, the discharge capacity retention ratio of Examples 7-1 and 7-2 was higher than that of Example 1-5. Further, in these cases, there was a tendency that the discharge capacity retention ratio became higher in the order of Example 7-1 in which the number of layers of the anode active material layer 54B was 1 and Example 7-2 in which the number of layers of the anode active material layer 54B was 2. Accordingly, it was confirmed that in the foregoing secondary battery, the higher effects were obtained by forming the anode active material layer 54B having the multilayer structure. Further, it was confirmed that when the number of layers thereof was increased, higher effects were obtained.

Example 8-1

A procedure was performed in the same manner as that of Example 1-5, except that 4-fluoro-1,3-dioxolane-2-one (FEC) as fluorinated ester carbonate (monofluoroethylene carbonate) was used instead of EC as a solvent.

Example 8-2

A procedure was performed in the same manner as that of Example 1-5, except that 4,5-difluoro-1,3-dioxolane-2-one (DFEC) as fluorinated ester carbonate (difluoroethylene carbonate) was added as a solvent, and the composition of the mixed solvent (EC:DFEC:DEC) was 25:5:70 at a weight ratio.

Example 8-3

A procedure was performed in the same manner as that of Example 8-1, except that vinylene carbonate (VC) as cyclic ester carbonate having an unsaturated bond was added as a solvent to the electrolytic solution. The VC content in the electrolytic solution was 10 wt %.

Example 8-4

A procedure was performed in the same manner as that of Example 8-1, except that vinyl ethylene carbonate (VEC) as cyclic ester carbonate having an unsaturated bond was added as a solvent to the electrolytic solution. The VEC content in the electrolytic solution was 10 wt %.

Example 8-5

A procedure was performed in the same manner as that of Example 1-5, except that 1,3-propene sultone (PRS) as sultone was added as a solvent to the electrolytic solution. The PRS content in the electrolytic solution was 1 wt %.

Example 8-6

A procedure was performed in the same manner as that of Example 1-5, except that lithium tetrafluoroborate ($LiBF_4$) was added as an electrolyte salt to the electrolytic solution. The concentration of $LiBF_4$ in the electrolytic solution was 0.1 mol/kg.

When the cycle characteristics of the secondary batteries of Examples 8-1 to 8-6 were examined, the results shown in Table 8 were obtained. Table 8 also shows the results of Example 1-5 and Comparative example 1.

For the secondary batteries of Examples 1-5 and 8-5, not only the cycle characteristics but also the swollenness characteristics were examined. When the swollenness characteristics were examined, the secondary battery was charged by the following procedure, and thereby the swollenness ratio was obtained. First, charge and discharge was performed 1 cycle in the atmosphere at 23 deg C. to stable the battery state. After that, the thickness before the second cycle charge was measured. Subsequently, charge was performed in the same atmosphere again. After that, the thickness after the second cycle charge was measured. Finally, swollenness ratio (%)=[(thickness after the second cycle charge−thickness before the second cycle charge)/thickness before charge]×100 was calculated. The charge condition was similar to that in examining the cycle characteristics.

TABLE 8

Anode active material: silicon (electron beam evaporation method)
Oxygen content = 3 atomic %; ten point height of roughness profile

| | Electrolytic solution Solvent (wt %) | | | | | Coating layer | | Discharge capacity retention ratio (%) | Swollenness ratio (%) |
|---|---|---|---|---|---|---|---|---|---|
| | EC | FEC | DFEC | DEC | Others | Type | Thickness (nm) | | |
| Example 1-5 | 50 | — | — | 50 | — | CoO | 1000 | 89 | 3 |
| Example 8-1 | — | 50 | — | 50 | — | | | 91 | — |

TABLE 8-continued

Anode active material: silicon (electron beam evaporation method)
Oxygen content = 3 atomic %; ten point height of roughness profile

| | Electrolytic solution Solvent (wt %) | | | | Coating layer | | Discharge capacity retention ratio | Swollenness ratio |
|---|---|---|---|---|---|---|---|---|
| | EC | FEC | DFEC | DEC | Others | Type | Thickness (nm) | (%) | (%) |
| Example 8-2 | 25 | — | 5 | 70 | — | | | 92 | — |
| Example 8-3 | — | 50 | — | 50 | VC | | | 92 | — |
| Example 8-4 | | | | | VEC | | | 92 | — |
| Example 8-5 | | | | | PRS | | | 90 | 0.4 |
| Example 8-6 | | | | | LiBF$_4$ | | | 91 | — |
| Comparative example 1 | 50 | — | — | 50 | — | — | — | 52 | — |

As shown in Table 8, as in Example 1-5, the discharge capacity retention ratio of examples 8-1 to 8-6 in which the solvent composition and the type of the electrolyte were different was higher than that of Comparative example 1. Accordingly, it was confirmed that in the secondary battery in which the coating layer 54C was provided on the anode active material layer 54B, even when the solvent composition and the type of the electrolyte salt were changed, the cycle characteristics were improved.

In particular, the discharge capacity retention ratio of Examples 8-1 and 8-2 was higher than that of Example 1-5. Further, in these cases, there was a tendency that the discharge capacity retention ratio of Example 8-2 in which the solvent contained DFEC was higher than that of Example 8-1 in which the solvent contained FEC. Accordingly, it was confirmed that in the foregoing secondary battery, the higher effects were obtained when the solvent contained fluorinated ester carbonate, and still higher effects were obtained when the solvent contained difluoroethylene carbonate rather than monofluoroethylene carbonate as fluorinated ester carbonate.

Further, the discharge capacity retention ratio of Examples 8-3 to 8-6 was higher than that of Example 1-5. Further, in these cases, there was a tendency that the discharge capacity retention ratio of Examples 8-3 and 8-4 in which the solvent respectively contained VC and VEC was higher than that of Examples 8-5 and 8-6 in which the solvent respectively contained PRS and LIBF$_4$. Accordingly, it was confirmed that in the foregoing secondary battery, the higher effects were obtained when the solvent contained cyclic ester carbonate having an unsaturated bond, sultone, or the electrolyte salt having boron or fluorine as an element, and still higher effects were obtained when the solvent contained cyclic ester carbonate having an unsaturated bond.

The swollenness ratio of Example 8-5 in which the solvent contained PRS was significantly small compared to that of Example 1-5 in which the solvent did not contain PRS. Accordingly, it was confirmed that in the foregoing secondary battery, when the solvent contained sultone, the swollenness characteristics were improved.

Example 9-1

A procedure was performed in the same manner as that of Example 1-5, except that the square secondary battery shown in FIG. 2 to FIG. 4 was fabricated by the following procedure instead of the laminated film type secondary battery.

First, the cathode 21 and the anode 22 were formed. After that, the cathode lead 24 made of aluminum and the anode lead 25 made of nickel were respectively welded to the cathode current collector 21A and the anode current collector 22A. Subsequently, the cathode 21, the separator 23, and the anode 22 were layered in this order, and spirally wound several times in the longitudinal direction, and formed in the flat shape. Thereby, the battery element 20 was formed. Subsequently, the battery element 20 was contained inside the battery can 11 made of aluminum. After that, the insulating plate 12 was arranged on the battery element 20. Subsequently, the cathode lead 24 and the anode lead 25 were respectively welded to the cathode pin 15 and the battery can 11. After that, the battery cover 13 was fixed to the open end of the battery can 11 by laser welding. Finally, the electrolytic solution was injected into the battery can 11 through the injection hole 19. After that, the injection hole 19 was sealed by the sealing member 19A, and thereby the square battery was completed.

Example 9-2

A procedure was performed in the same manner as that of Example 9-1, except that the battery can 11 made of iron was used instead of the battery can 11 made of aluminum.

When the cycle characteristics of the secondary batteries of Examples 9-1 and 9-2 were examined, the results shown in Table 9 were obtained. Table 9 also shows the results of Example 1-5 and Comparative example 1.

TABLE 9

Anode active material: silicon (electron beam evaporation method)
Oxygen content = 3 atomic %; ten point height of roughness profile
Rz = 3.5 μm

| | Battery structure | Coating layer Type | Thickness (nm) | Discharge capacity retention ratio (%) |
|---|---|---|---|---|
| Example 1-5 | Laminated film type | CoO | 1000 | 89 |
| Example 9-1 | Square (aluminum) | | | 91 |
| Example 9-2 | Square (iron) | | | 93 |
| Comparative example 1 | — | — | — | 52 |

As shown in Table 9, as in Example 1-5, the discharge capacity retention ratio of Examples 9-1 and 9-2 in which the battery structure was different was higher than that of Comparative example 1 as well. Accordingly, it was confirmed that in the secondary battery in which the coating layer 54C was provided on the anode active material layer 54B, even when the battery structure was changed, the cycle characteristics were improved.

In particular, the discharge capacity retention ratio of Examples 9-1 and 9-2 was higher than that of Example 1-5. Further, in these cases, there was a tendency that the discharge capacity retention ratio of Example 9-2 in which the battery can 11 was made of iron was higher than that of Example 9-1 in which the battery can 11 was made of aluminum. Accordingly, it was confirmed that in the foregoing secondary battery, the higher effects were obtained when the battery structure was square, and still higher effects were obtained when the battery can 11 made of iron was used. Though no specific examples for a cylindrical secondary battery in which the package member is made of a metal material have been herein disclosed, it is evident that similar effects can be obtained in such a cylindrical secondary battery since the cycle characteristics were improved in the square secondary battery in which the package member is made of the metal material rather than in the laminated film type secondary battery.

Examples 10-1 to 10-8

A procedure was performed in the same manner as that of Examples 1-1 to 1-8, except that the anode active material layer 54B was formed by sintering method instead of electron beam evaporation method. The anode active material layer 54B was formed as follows. 90 parts by weight of silicon powder (average particle diameter=1 μm) as an anode active material and 10 parts by weight of polyimide as a binder were mixed to obtain an anode mixture. After that, the anode mixture was dispersed in N-methyl-2-pyrrolidone to obtain paste anode mixture slurry. Then, the both faces of the anode current collector 54A were uniformly coated with the anode mixture slurry, which was dried. After that, the resultant was heated in the vacuum atmosphere at 220 deg C. for 12 hours.

Comparative Example 10

A procedure was performed in the same manner as that of Comparative example 1, except that the anode active material layer 54B was formed by a procedure similar to that of Examples 10-1 to 10-8

When the cycle characteristics of the secondary batteries of Examples 10-1 to 10-8 and Comparative example 10 were examined, the results shown in Table 10 were obtained.

TABLE 10

Anode active material: silicon (sintering method)
Oxygen content = 3 atomic %; ten point height of roughness profile
Rz = 3.5 μm

| | Coating layer | | Discharge capacity |
| --- | --- | --- | --- |
| | Type | Thickness (nm) | retention ratio (%) |
| Example 10-1 | CoO | 5 | 69 |
| Example 10-2 | | 10 | 81 |
| Example 10-3 | | 50 | 82 |

TABLE 10-continued

Anode active material: silicon (sintering method)
Oxygen content = 3 atomic %; ten point height of roughness profile
Rz = 3.5 μm

| | Coating layer | | Discharge capacity |
| --- | --- | --- | --- |
| | Type | Thickness (nm) | retention ratio (%) |
| Example 10-4 | | 100 | 82 |
| Example 10-5 | | 1000 | 83 |
| Example 10-6 | | 2000 | 82 |
| Example 10-7 | | 3000 | 78 |
| Example 10-8 | | 4000 | 70 |
| Comparative example 10 | — | — | 48 |

As shown in Table 10, the discharge capacity retention ratio of Examples 10-1 to 10-8 in which the coating layer 54C was formed was higher than that of Comparative example 10 in which the coating layer 54C was not formed. Accordingly, it was confirmed that even in the secondary battery including the anode active material layer 54B formed by sintering method, the cycle characteristics were improved by providing the coating layer 54C containing the oxide of the 3d transition metal element on the surface of the anode active material layer 54B.

In particular, in Examples 10-1 to 10-8, there was a tendency that as the thickness of the coating layer 54C became larger, the discharge capacity retention ratio was increased and then decreased. In this case, when the thickness was smaller than 10 nm or larger than 3000 nm, the discharge capacity retention ratio was largely decreased. Accordingly, it was confirmed that in the foregoing secondary battery, when the thickness of the coating layer 54C was in the range from 10 nm to 3000 nm, higher effects were obtained.

As evidenced by the foregoing results of Table 1 to Table 10, it was confirmed that the cycle characteristics were improved by providing the coating layer 54C containing the oxide of the 3d transition metal element on the surface of the anode active material layer 54B when the anode active material layer 54B contained the anode active material having silicon as an element regardless of the method of forming the anode active material layer 54B.

The invention has been described with reference to the embodiment and the examples. However, the invention is not limited to the aspects described in the foregoing embodiment and the foregoing examples, and various modifications may be made. For example, in the foregoing embodiment and the foregoing examples, the descriptions have been given of the lithium ion secondary battery in which the anode capacity is expressed by the capacity component based on insertion and extraction of lithium as a battery type. However, the battery of the invention is not limited thereto. The invention can be similarly applied to a secondary battery in which the anode capacity includes the capacity component based on insertion and extraction of lithium and the capacity component based on precipitation and dissolution of lithium, and the anode capacity is expressed by the sum of these capacity components, by setting the charge capacity of the anode material capable of inserting and extracting lithium to a smaller value than that of the charge capacity of the cathode.

Further, in the foregoing embodiment or the foregoing examples, the description has been given with the specific examples of the square, cylindrical, or laminated film type secondary battery as a battery structure, and with the specific example of the battery in which the battery element has the spirally winding structure. However, the battery of the invention can be similarly applied to a battery having other structure such as a coin type battery and a button type battery, or a battery in which the battery element has other structure such as a lamination structure. Further, the battery of the invention can be applied to other types of batteries such as primary batteries in addition to the secondary batteries.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium (Mg) and calcium (Ca), or other light metal such as aluminum may be used. In this case, the anode material described in the foregoing embodiment can be used as an anode active material as well.

Further, in the foregoing embodiment and the foregoing examples, regarding the thickness of the coating layer in the anode and the battery of the invention, the appropriate numerical value range thereof derived from the results of the examples has been described. However, such a description does not totally eliminate the possibility that the thickness may be out of the foregoing range. That is, the foregoing appropriate range is the range particularly preferable for obtaining the effects of the invention. Therefore, as long as effects of the invention can be obtained, the thickness may be out of the foregoing range in some degrees. The same is applied to the oxygen content in the anode active material, the content of metal element in the anode active material, and the ten point height of roughness profile Rz on the surface of the anode current collector, in addition to the foregoing thickness of the coating layer It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode comprising:
an anode active material layer having opposed first and second surfaces and containing an anode active material comprising a silicon material; and
a coating layer formed by vapor-phase deposition that coats the first surface of the anode active material layer, the coating layer containing an oxide selected from the group consisting of FeO, CoO, NiO and combinations thereof,
wherein the silicon material is
an alloy of silicon including at least one selected from the group consisting of tin, cobalt, manganese, zinc, indium, silver, germanium, bismuth and chromium, or
a compound of silicon including oxygen and carbon.

2. The anode according to claim 1, wherein a thickness of the coating layer is in a range from 10 nm to 3000 nm.

3. The anode according to claim 1, wherein the anode active material layer has a multilayer structure formed by forming a film multiple times.

4. The anode according to claim 1, wherein:
the anode active material comprises oxygen; and
an oxygen content in the anode active material is in a range from 3 atomic % to 40 atomic %.

5. The anode according to claim 1, wherein:
the anode active material layer comprises a plurality of layers including an oxygen-containing layer in which the anode active material comprises oxygen; and
an oxygen content in the oxygen-containing layer is higher than an oxygen content in at least one of the plurality of layers other than the oxygen-containing layer.

6. The anode according to claim 1, wherein:
the anode active material layer comprises a plurality of layers including a metal-element-containing layer in which the anode active material comprises at least one metal element selected from the group consisting of iron, cobalt, nickel, titanium, chromium, and molybdenum; and
a content of the metal element in the metal-element-containing layer is higher than a content of the metal element in at least one of the plurality of layers other than the metal-element-containing layer.

7. The anode according to claim 1 further comprising:
an anode current collector supporting the anode active material layer, wherein a surface of the anode current collector opposed to the anode active material layer is roughened by microparticles formed by electrolytic process.

8. The anode according to claim 7, wherein ten point height of roughness profile Rz of the surface of the anode current collector is in a range from 1.5 µm to 5 µm.

9. A battery comprising a cathode, an anode, and an electrolytic solution,
wherein the anode comprises an anode active material layer having opposed first and second surfaces and containing an anode active material comprising a silicon material, and
a coating layer formed by vapor-phase deposition that coats the first surface of the anode active material layer, the coating layer containing an oxide selected from the group consisting of FeO, CoO, NiO and combinations thereof,
wherein the silicon material is
an alloy of silicon including at least one selected from the group consisting of tin, cobalt, manganese, zinc, indium, silver, germanium, bismuth and chromium, or
a compound of silicon including oxygen and carbon.

10. The battery according to claim 9, wherein a thickness of the coating layer is in a range from 10 nm to 3000 nm.

11. The battery according to claim 9, wherein the anode active material layer has a multilayer structure formed by forming a film multiple times.

12. The battery according to claim 9, wherein:
the anode active material comprises oxygen; and
an oxygen content in the anode active material is in a range from 3 atomic % to 40 atomic %.

13. The battery according to claim 9, wherein:
the anode active material layer comprises a plurality of layers including an oxygen-containing layer in which the anode active material comprises oxygen; and
an oxygen content in the oxygen-containing layer is higher than an oxygen content in at least one of the plurality of layers other than the oxygen-containing layer.

14. The battery according to claim 9, wherein:
the anode active material layer comprises a plurality of layers including a metal-element-containing layer in which the anode active material comprises at least one metal element selected from the group consisting of iron, cobalt, nickel, titanium, chromium, and molybdenum; and
a content of the metal element in the metal-element-containing layer is higher than a content of the metal element in at least one of the plurality of layers other than the metal-element-containing layer.

15. The battery according to claim 9, wherein the anode further comprises:
an anode current collector supporting the anode active material layer, wherein a surface of the anode current collector opposed to the anode active material layer is roughened by microparticles formed by electrolytic process.

16. The battery according to claim 15, wherein ten point height of roughness profile Rz of the surface of the anode current collector is in a range from 1.5 μm to 5 μm.

17. The battery according to claim 9, wherein the electrolytic solution contains a solvent containing sultone.

18. The battery according to claim 17, wherein the sultone is 1,3-propene sultone.

19. The battery according to claim 9, wherein the electrolytic solution contains a solvent containing cyclic ester carbonate having an unsaturated bond.

20. The battery according to claim 19, wherein the cyclic ester carbonate having an unsaturated bond is vinylene carbonate or vinyl ethylene carbonate.

21. The battery according to claim 9, wherein the electrolytic solution contains a solvent containing fluorinated ester carbonate.

22. The battery according to claim 21, wherein the fluorinated ester carbonate is difluoroethylene carbonate.

23. The battery according to claim 9, wherein the electrolytic solution contains an electrolyte salt having boron and fluorine as an element.

24. The battery according to claim 23, wherein the electrolyte salt is lithium tetrafluoroborate.

25. The battery according to claim 9, wherein the cathode, the anode, and the electrolytic solution are contained inside a cylindrical or square package member.

26. The battery according to claim 25, wherein the package member contains iron or an iron alloy.

27. The battery according to claim 4, wherein at least part of the oxygen in the anode active material is bonded to part of the silicon in a form of silicon monoxide, silicon dioxide, or a metastable state.

28. The battery according to claim 13, wherein at least part of the oxygen in the anode active material is bonded to part of the silicon in a form of silicon monoxide, silicon dioxide, or a metastable state.

29. The anode according to claim 1, wherein the second surface is in contact with an anode current collector.

30. The battery according to claim 9, wherein the second surface is in contact with an anode current collector.

31. The anode according to claim 1, wherein the coating layer contains FeO.

32. The anode according to claim 1, wherein the coating layer contains CoO.

33. The anode according to claim 1, wherein the silicon material is an alloy of silicon including tin.

34. The anode according to claim 1, wherein the silicon material is an alloy of silicon including cobalt.

35. The anode according to claim 1, wherein the silicon material is an alloy of silicon including manganese.

36. The anode according to claim 1, wherein the silicon material is an alloy of silicon including zinc.

37. The anode according to claim 1, wherein the silicon material is an alloy of silicon including indium.

38. The anode according to claim 1, wherein the silicon material is an alloy of silicon including silver.

39. The anode according to claim 1, wherein the silicon material is an alloy of silicon including germanium.

40. The anode according to claim 1, wherein the silicon material is an alloy of silicon including bismuth.

41. The anode according to claim 1, wherein the silicon material is an alloy of silicon including chromium.

42. The anode according to claim 1, wherein the silicon material is a compound of silicon including oxygen and carbon.

* * * * *